(12) United States Patent
Sun et al.

(10) Patent No.: US 12,519,102 B2
(45) Date of Patent: Jan. 6, 2026

(54) NEGATIVE ELECTRODE MATERIAL, PREPARATION METHOD THEREFOR, AND APPLICATION THEREOF, AND LITHIUM ION BATTERY COMPRISING SAME

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Sai Sun, Shanghai (CN); Siyu Zhang, Shanghai (CN); Huanxin Gao, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 952 days.

(21) Appl. No.: 17/754,393

(22) PCT Filed: Sep. 29, 2020

(86) PCT No.: PCT/CN2020/118704
§ 371 (c)(1),
(2) Date: Mar. 31, 2022

(87) PCT Pub. No.: WO2021/068793
PCT Pub. Date: Apr. 15, 2021

(65) Prior Publication Data
US 2022/0393152 A1 Dec. 8, 2022

(30) Foreign Application Priority Data

Oct. 9, 2019 (CN) .......................... 201910953233.6
Oct. 9, 2019 (CN) .......................... 201910953279.8

(51) Int. Cl.
*H01M 4/134* (2010.01)
*H01M 4/04* (2006.01)
(Continued)

(52) U.S. Cl.
CPC ......... *H01M 4/366* (2013.01); *H01M 4/0471* (2013.01); *H01M 4/386* (2013.01);
(Continued)

(58) Field of Classification Search
None
See application file for complete search history.

(56) References Cited

U.S. PATENT DOCUMENTS

2013/0323595 A1 12/2013 Sohn et al.
2015/0243973 A1* 8/2015 Newbound ............ H01M 4/62
429/218.1

(Continued)

FOREIGN PATENT DOCUMENTS

| CN | 101179126 B | 9/2011 |
| CN | 102945949 A | 2/2013 |

(Continued)

OTHER PUBLICATIONS

Harris, Kiristopher J. et al.; "Electrochemical Changes in Lithium-Battery Electrodes Studied Using 7Li NMR and Enhanced 13C NMR of Graphene and Graphitic Carbons"; Chemistry of Materials; Apr. 9, 2015; vol. 27; pp. 3299-3305.
(Continued)

*Primary Examiner* — Yoshitoshi Takeuchi
(74) *Attorney, Agent, or Firm* — NKL Law; Allen Xue

(57) ABSTRACT

A silicon-based negative electrode material, a preparation method therefor, and an application thereof in a lithium ion
(Continued)

(a) (b)

(c) (d)

battery are provided. A lithium ion battery contains the silicon-based negative electrode material. The negative electrode material contains a silicon-containing material and a phosphorus-containing coating layer at the surface of the silicon-containing material. The phosphorus-containing coating layer contains a polymer that has polycyclic aromatic hydrocarbon structural segments. The negative electrode material exhibits improved initial coulombic efficiency, reversible charging specific capacity, cycle charging capacity retention and conductivity. When used in the lithium ion battery, the negative electrode material may improve the energy density of the battery.

12 Claims, 9 Drawing Sheets

(51) Int. Cl.
| | |
|---|---|
| *H01M 4/1395* | (2010.01) |
| *H01M 4/36* | (2006.01) |
| *H01M 4/38* | (2006.01) |
| *H01M 4/587* | (2010.01) |
| *H01M 4/62* | (2006.01) |
| *H01M 10/0525* | (2010.01) |
| *H01M 4/02* | (2006.01) |

(52) U.S. Cl.
CPC ........... *H01M 4/587* (2013.01); *H01M 4/625* (2013.01); *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2015/0303456 A1* | 10/2015 | Yoo | H01M 4/40 252/182.1 |
| 2017/0294643 A1 | 10/2017 | Burshtain et al. | |
| 2018/0083263 A1 | 3/2018 | Cho et al. | |
| 2018/0175390 A1 | 6/2018 | Sun | |
| 2019/0044133 A1 | 2/2019 | Burshtain et al. | |
| 2020/0058941 A1 | 2/2020 | Hayashi et al. | |

FOREIGN PATENT DOCUMENTS

| | | |
|---|---|---|
| CN | 103400971 A | 11/2013 |
| CN | 105047887 A | 11/2015 |
| CN | 105932284 A | 9/2016 |
| CN | 106463707 A | 2/2017 |
| CN | 106531992 A | 3/2017 |
| CN | 106898736 A | 6/2017 |
| CN | 107431192 A | 12/2017 |
| CN | 107768625 A | 3/2018 |
| CN | 108063221 A | 5/2018 |
| CN | 108172775 A | 6/2018 |
| CN | 108461723 A | 8/2018 |
| CN | 109952670 A | 6/2019 |
| CN | 111146422 A | 5/2020 |
| CN | 111146434 A | 5/2020 |
| CN | 111653738 A | 9/2020 |
| CN | 111916686 A | 11/2020 |
| CN | 112635745 A | 4/2021 |
| CN | 112652755 A | 4/2021 |
| JP | 2010287505 A | 12/2010 |
| WO | 2016153322 A1 | 9/2016 |
| WO | 2016152056 A1 | 1/2018 |
| WO | 2018061536 A1 | 5/2018 |
| WO | 2018146865 A1 | 8/2018 |
| WO | 2020091876 A1 | 5/2020 |

OTHER PUBLICATIONS

Zhou, Jin R. et al.; "Phytic acid in health and disease"; Critical Reviews in Food Science and Nutrition; 1995; vol. 35, No. 6; pp. 495-508.

He, Dan et al.: "Hierarchical C-P(=O)(-O-)n (n≤2)-linked nano-Si/ N-doped C/ graphene porous foam as anodes for high-performance lithium ion batteries"; Carbon; vol. 141; Year: 2019, available online on Oct. 4, 2018; pp. 531-541.

\* cited by examiner (a) (b)

(c) (d)

# NEGATIVE ELECTRODE MATERIAL, PREPARATION METHOD THEREFOR, AND APPLICATION THEREOF, AND LITHIUM ION BATTERY COMPRISING SAME

TECHNICAL FIELD

The present disclosure generally relates to the field of lithium ion batteries. More particular, the present disclosure relates to a silicon-based negative electrode material comprising a phosphorus-containing coating layer, a preparation method therefor and an application thereof in a lithium ion battery, and also relates to a lithium ion battery comprising the silicon-based negative electrode material.

BACKGROUND

In recent years, there are increasing commercial demands for high energy density lithium ion batteries. At present, the negative electrode materials for commercial lithium ion batteries are mainly carbon-containing materials. The theoretical specific capacity of carbon is only 372 mAh/g, which cannot meet the demand for high energy density lithium ion batteries. Silicon has a theoretical specific capacity of 4200 mAh/g, which should be the most promising negative electrode material for lithium ion batteries. However, silicon has a charging/discharging mechanism which is different from that of graphite. Solid electrolyte interface (SEI) films may continuously form at the interface between Si and Li ions in the electrolyte during charging and discharging. The formation of irreversible SEI may consume a lot of Li ions from the electrolyte and positive electrode materials. Therefore, the initial cycle coulombic efficiency (also referred as the initial coulombic efficiency, ICE) of silicon-based negative electrode materials is usually only 65-85%. In addition, the conductivity and lithium ion diffusion rate of silicon are both lower than those of graphite, which may limit the performance of silicon under high current and high power conditions.

In order to solve the above problems, it has been proposed to improve the performance of silicon-based negative electrode materials by doping, nanosizing, surface modifying, prelithiating and the like. Among the disclosed processes, nanosizing, coating and alloying are the focus of the research and development for modifying silicon-based negative electrode materials. Nanosizing can reduce the volume changes of silicon-based materials during charging and discharging, and thereby significantly improve the cycle stability of the materials. However, the nanosized silicon has a large specific surface area and is easy to agglomerate. Therefore, the nanosized silicon cannot be evenly distributed in a porous matrix, resulting in poor cycle stability and uniformity of materials. Coating refers to applying a certain thickness of protective layer on the surface of silicon-containing materials. It can not only alleviate the volume expansion of silicon, but also inhibit the side reaction between silicon-containing material and electrolyte, and thereby improve the initial coulombic efficiency and cycle stability of materials. At present, the commonly used coating methods are solid phase ball milling, spray coating, liquid phase coating and the like. However, the thickness and uniformity of the coating obtained by such processes are difficult to accurately control. Accordingly, while improving the cycle stability of the material, it may reduce the reversible charging capacity and cycle stability at different current rates of the material to varying degrees. Alloying is a new modification process developed in recent years. Generally, silicon reacts with metal precursors such as aluminum, magnesium and copper to form Si—Al, Si—Mg and Si—Cu alloys. It can not only buffer volume expansion, but also improve the conductivity of silicon-containing materials, and thereby improve some electrical properties of negative electrode materials. However, silicon alloys also have some disadvantages, such as low reversible charging capacity and some alloys being sensitive to water and oxygen, which cannot meet the commercial demand right now. Accordingly, the current preparation process is difficult to completely solve the defects of poor cycle stability, low initial coulombic efficiency and poor cycle stability at different current rates associated with silicon-based negative electrodes.

CN108172775A discloses a phosphorus doped silicon-based negative electrode material. Its examples show that the phosphorus doped silicon-based negative electrode has an initial coulombic efficiency of 91.7% with a specific capacity of 610.1 mAh/g. The preparation process of CN108172775A requires spray drying and thereby is low in yield but high in cost. CN101179126B discloses a doped silicon-based negative electrode material for lithium ion batteries. By doping at least one element of boron, aluminum, gallium, antimony and phosphorus, the initial coulombic efficiency of the silicon-based negative electrode material is improved. CN101179126B needs high vacuum argon arc fusion welding in the preparation process, which requires high reaction temperature (>1000° C.), complex reactions (involving fusion welding, low-temperature blowing, rapid cooling, planetary ball milling and other operations), and thereby high cost. CN103400971A discloses lithium silicate doped silicon-carbon negative electrode material. When silicon is added in an amount of 50% and $Li_2SiO_3$ in an amount of 35%, the resulting material has a specific capacity of 1156.2 mAh/g and an initial coulombic efficiency of 88.2%.

As mentioned above, although some progress has been made in the modification of silicon-based negative electrode materials, it can usually only improve one performance of silicon-based negative electrode materials, rather than improve their comprehensive electrical properties. However, when used in high energy density lithium ion batteries, it is desired that the negative electrode material simultaneously has excellent reversible charging specific capacity, initial coulombic efficiency and cycle charging capacity retention, especially excellent initial coulombic efficiency and cycle charging capacity retention at the same time. Therefore, there is still a demand for developing silicon-based negative electrode materials with improved initial coulombic efficiency, reversible charging specific capacity, cycle charging capacity retention and conductivity. A simple method for preparing such silicon-based negative electrode materials is also needed.

SUMMARY OF THE DISCLOSURE

In order to solve one or more of the above problems in prior art, the present disclosure provides a silicon-based negative electrode material comprising a phosphorus-containing coating layer, a preparation method for the negative electrode material and use of the negative electrode material in a lithium ion battery, and a lithium ion battery comprising the negative electrode material. The negative electrode material of the present disclosure has improved reversible charging capacity (also referred as reversible charging specific capacity) and initial coulombic efficiency, and is particularly suitable for lithium ion batteries.

In one embodiment, the present disclosure relates to a negative electrode material, comprising: a silicon-containing material and a phosphorus-containing coating layer at the surface of the silicon-containing material, wherein the phosphorus-containing coating layer comprises a polymer that has polycyclic aromatic hydrocarbon structural segments.

In one embodiment, the present disclosure relates to a method for preparing a negative electrode material, wherein the negative electrode material comprises a silicon-containing material and a phosphorus-containing coating layer at the surface of the silicon-containing material, wherein the phosphorus-containing coating layer comprises a polymer having polycyclic aromatic hydrocarbon structural segments, and wherein the method comprises:
  (1) contacting the silicon-containing material, a phosphorus source and a solvent at 30-80° C. to graft the phosphorus source to the surface of the silicon-containing material; and
  (2) subjecting to a temperature programmed calcining to convert the phosphorus source around the silicon-containing material into the phosphorus-containing coating layer comprising the polymer having polycyclic aromatic hydrocarbon structural segments, wherein the temperature programmed calcining comprises:
  heating to a first temperature of 400-500° C. at a first heating rate,
  heating to a second temperature of 600-800° C. at a second heating rate, wherein the second heating rate is lower than the first heating rate, and
  keeping at the second temperature.

In one embodiment, the present disclosure relates to the negative electrode material prepared by the above method.

In one embodiment, the present disclosure relates to use of the above negative electrode material in a lithium ion battery.

In one embodiment, the present disclosure relates to a lithium ion battery, comprising: a negative electrode comprising the above negative electrode material, a positive electrode, a separator and an electrolyte.

Specifically, the present disclosure may be embodied in the following items:

1. A negative electrode material for batteries, comprising: a polymeric lithium salt, a phosphorus source and an active component, wherein the active component contains silicon element.

2. The negative electrode material of item 1, wherein the polymeric lithium salt has a weight average molecular weight of 2000-5000000, preferably 80000-240000;
  preferably, the molecular chain of the polymeric lithium salt includes —C(O)—OLi group;
  preferably, the polymeric lithium salt is at least one selected from the group consisting of lithium polyacrylate, lithium polymethacrylate, lithium polymaleate, lithium polyfumarate, lithium carboxymethylcellulose and lithium alginate.

3. The negative electrode material of item 1 or 2, wherein, based on the total amount of the negative electrode material, the polymeric lithium salt is present in an amount of 1-15 wt %, the phosphorus source is present in an amount of 10-60 wt %, and the active component is present in an amount of 25-75 wt %;
  preferably, based on the total amount of the negative electrode material, the polymeric lithium salt is present in an amount of 3-15 wt %, the phosphorus source is present in an amount of 14-45 wt %, and the active component is present in an amount of 40-75 wt %.

4. The negative electrode material of any one of items 1-3, wherein the phosphorus source is connected with the silicon element through a chemical bond, preferably the chemical bond is P(O)—O—Si;
  preferably, the phosphorus source is a polybasic phosphoric acid, further preferably phytic acid;
  preferably, the phosphorus source is coated on the surface of the silicon.

5. The negative electrode material of any one of items 1-4, wherein the negative electrode material further comprises a conductive agent;
  preferably, the conductive agent is at least one selected from the group consisting of carbon nanotubes, acetylene black and conductive carbon black;
  preferably, the conductive agent is present in an amount of 1-10 wt % based on the total amount of the negative electrode material.

6. A method for preparing a negative electrode material for batteries, comprising the steps of:
  (1) mixing a silicon source, a phosphorus source and a solvent;
  (2) drying the material obtained in the step (1) of mixing;
  (3) mixing the solid material obtained in the drying with a polymeric lithium salt.

7. The method of item 6, wherein the silicon source comprises silicon powder;
  preferably, the phosphorus source is a polybasic phosphoric acid, preferably phytic acid;
  preferably, the solvent is an organic solvent, preferably at least one selected from the group consisting of toluene, N,N-dimethylformamide, N,N-dimethylacetamide and N-methylpyrrolidone.

8. The method of item 6, wherein the step (1) of mixing comprises:
  mixing the phosphorus source with the solvent, and then adding the silicon source;
  preferably, the mass ratio of the phosphorus source to the silicon source is 0.1-2:1, further preferably 0.5-1:1;
  preferably, the material obtained in the step (1) of mixing has a solid content of 5-40 wt %.

9. The method of any one of items 6-8, wherein in the step (3), the mass ratio of the solid material obtained in the drying to the polymeric lithium salt is 1:(0.03-0.15), preferably 1:(0.08-0.13);
  preferably, the polymeric lithium salt has a weight average molecular weight of 2000-5000000, preferably 80000-240000;
  preferably, the molecular chain of the polymeric lithium salt includes —C(O)—OLi group;
  preferably, the polymeric lithium salt is at least one selected from the group consisting of lithium polyacrylate, lithium polymethacrylate, lithium polymaleate, lithium polyfumarate, lithium carboxymethylcellulose and lithium alginate;
  preferably, the step (3) of mixing is carried out in the presence of water;
  preferably, the method further comprises introducing a conductive agent in the step (3);
  preferably, the conductive agent is at least one selected from the group consisting of carbon nanotubes, acetylene black and conductive carbon black;
  preferably, the mass ratio of the solid material obtained in the drying to the conductive agent is 1:(0.01-0.12), preferably 1:(0.06-0.1).

10. The negative electrode material for batteries prepared by the method of any one of items 6-9.

11. Use of the negative electrode material for batteries of any one of items 1-5 and 10 in a lithium ion battery.

12. A lithium ion battery, comprising: the negative electrode material for batteries of any one of items 1-5 and 10, a positive material, a separator and an electrolyte;

preferably, the lithium ion battery is a liquid lithium ion battery, a semi-solid lithium ion battery or a solid lithium ion battery.

The negative electrode material of the present disclosure may have the following advantages.

(1) The negative electrode material of the present disclosure has a phosphorus-containing coating layer. At the high temperature of the temperature programmed calcining, some phosphorus element may diffuse into silicon to form occupation doping, so as to improve the conductivity of silicon-based negative electrode materials.

(2) The phosphorus-containing coating layer of the present disclosure comprises a polymer having polycyclic aromatic hydrocarbon structural segments, which means that the phosphorus-containing coating layer has a dense structure. On the one hand, the coating layer with a dense structure can resist the volume expansion of silicon-based negative electrode materials during charging and discharging, and thereby ensure the structural integrity and safety of the battery. On the other hand, the coating layer with a dense structure can more effectively block the channel for lithium ion accessing to the silicon-based negative electrode material, thereby reduce and avoid the formation of irreversible SEI, and correspondingly alleviate and eliminate its adverse effects on the electrical performances (such as ICE, reversible charging capacity and cycle charging capacity retention).

(3) The phosphorus-containing coating layer of the present disclosure is obtained by high temperature treatment. High temperature treatment may remove at least part of the polar groups on the surface of the coating layer. Therefore, on the one hand, although the negative electrode material of the present disclosure has a very small particle size and the median particle size can even be in the order of nanometers, it is not easy to agglomerate. Accordingly, it has excellent storage stability and dispersability. In addition, the negative electrode material of the present disclosure is more suitable for further surface modification, and thereby has excellent process ability.

BRIEF DESCRIPTION OF THE DRAWINGS

The accompanying drawings are included to provide a further understanding of the invention and are a part of this specification, which, together with the following detailed description, illustrate embodiments of the invention but not to limit the scope thereof. In the drawings.

DETAILED DESCRIPTION

Figure 1:
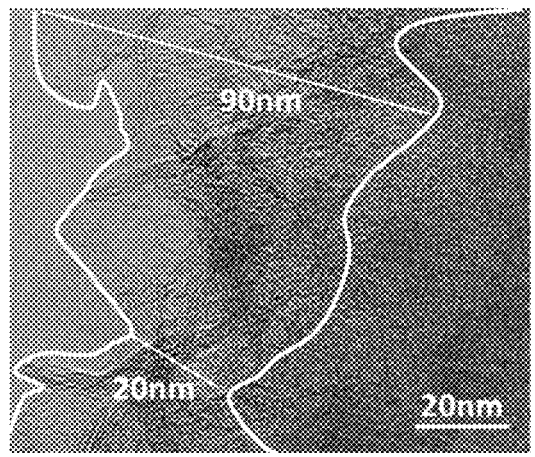
FIG. 1 shows transmission electron microscope (TEM) diagrams of the intermediates of the phosphorus-containing coating layers involved in comparative example 1 and examples 1-3.
Figure 1:
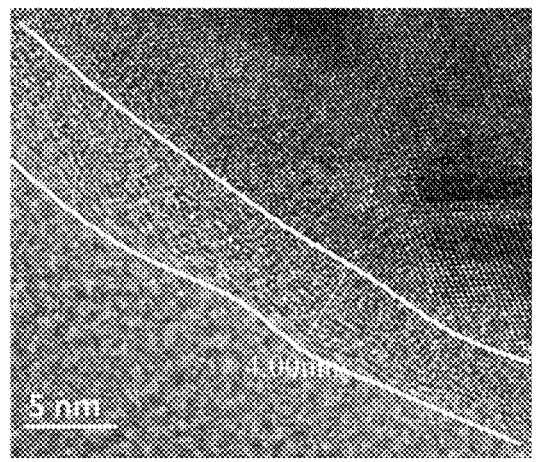
Figure 1:
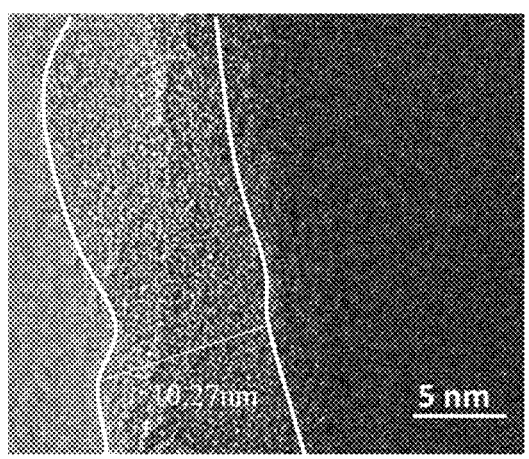
Figure 1:
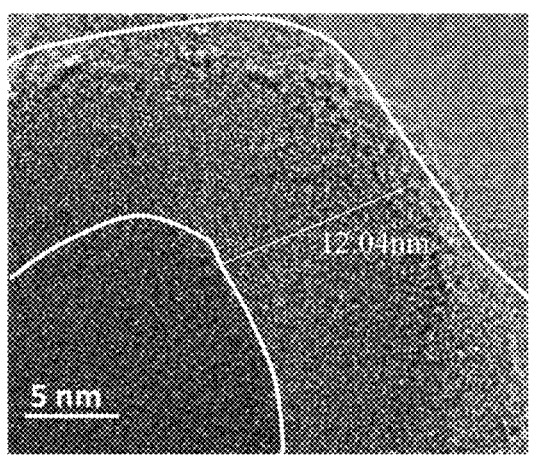

It should be understood that the endpoints and any values in the ranges disclosed herein are not limited to the precise range or value, but to encompass values close to those ranges or values. For ranges of values, it is possible to combine between the endpoints of each of the ranges, between the endpoints of each of the ranges and the individual points, and between the individual points to give one or more new ranges of values as if these ranges of values are specifically disclosed herein.

Other than in the examples, all numerical values of parameters in this specification are to be understood as being modified in all instances by the term "about" whether or not "about" actually appears before the numerical value.

In this specification, the median particle size (or $D_{50}$) refers to the particle size when the cumulative particle size distribution percentage reaches 50%. The median particle size is often used to represent the average particle size of powders.

In one embodiment, the present disclosure relates to a negative electrode material, comprising: a silicon-containing material and a phosphorus-containing coating layer at the surface of the silicon-containing material, wherein the phosphorus-containing coating layer comprises a polymer having polycyclic aromatic hydrocarbon structural segments.

In the negative electrode material of the present disclosure, the phosphorus-containing coating layer has a very small thickness which is in high uniformity. Generally, the phosphorus-containing coating layer has a thickness of 2-6 nm.

The silicon-containing material is at least one selected from the group consisting of elemental silicon, $SiO_x$ wherein $0.6<x<1.5$, and silicon-containing alloys. Preferably, the silicon-containing material is elemental silicon. Elemental silicon is usually used in a form of silicon powders. Preferably, silicon powders have a median particle size of 0.05-10 μm.

The silicon-containing materials may be commercially available or prepared by known methods.

Preferably, the silicon-containing alloy is at least one selected from the group consisting of silicon-aluminum alloy, silicon-magnesium alloy, silicon-zirconium alloy and silicon-boron alloy. There is not any special limitation on the content of silicon in the silicon-containing alloys. It is possible to be selected within a wide range. For example, based on the total amount of the silicon-containing alloy, silicon may be present in an amount of 10-50 wt %. There is not any special limitation on the method for preparing the silicon-containing alloy. For example, provided herein is a method for preparing silicon-aluminum alloy, comprising the steps of: 1) ball milling aluminum powder and silicon powder for 30 min under an inert protection atmosphere; and 2) treating the mixture obtained in the above step at 900° C. for 10 hours.

In one variant, the polymer having polycyclic aromatic hydrocarbon structural segments is prepared from a phosphorus source selected from the group consisting of organic polybasic phosphoric acid and its esters or salts, preferably phytic acid.

The polycyclic aromatic hydrocarbon structural segments of the polymer having polycyclic aromatic hydrocarbon structural segments may be characterized by $^{13}$C-NMR. In one variant, the $^{13}$C-NMR spectrum of the polymer having polycyclic aromatic hydrocarbon structural segments involves signals at 110 ppm-140 ppm, indicating the presence of the polycyclic aromatic hydrocarbon structural segments. Message relating to the chemical shifts of polycyclic aromatic hydrocarbons in $^{13}$C-NMR spectrum is disclosed in: Harris, K. J., Reeve Z. E. M., et al. Electrochemical Changes in Lithium-Battery Electrodes Studied Using $^{7}$Li NMR and Enhanced $^{13}$C NMR of Graphene and Graphitic Carbons[J]. Chem. Mater. 2015, 27, 9, pp 3299-3305, which is fully incorporated herein by reference.

In one variant, phosphorus in the phosphorus-containing coating layer at the surface of the silicon-containing material and silicon in the silicon-containing material are connected via a chemical bond, preferably P(O)—O—Si. By connecting via a chemical bond, the silicon-containing material is more closely connected with the phosphorus-containing coating layer around it. The connecting of phosphorus and silicon via P(O)—O—Si may be characterized by $^{29}$Si-NMR spectrum.

Optionally, the negative electrode material may further comprise a carbon layer on the surface of the phosphorus-containing coating layer. The carbon layer may form a housing for the negative electrode material, which contains the silicon-containing material and the phosphorus-containing coating layer at the surface of the silicon-containing material. The carbon layer may be in a porous structure. There is not any special limitation on the pore size distribution of the porous structure.

Optionally, the negative electrode material may further comprise a polymeric lithium salt, preferably a polymeric lithium salt having a —C(O)—OLi group in its molecular chain. The group can be characterized by total reflection Fourier transform absorption infrared spectroscopy.

The introduction of polymeric lithium salt into the negative electrode material can compensate the lithium loss in the negative electrode material during charging and discharging, so as to improve the reversible charging capacity and ICE of the negative electrode material.

The polymeric lithium salt is preferably at least one selected from the group consisting of lithium polyacrylate, lithium polymethacrylate, lithium polymaleate, lithium polyfumarate, lithium carboxymethylcellulose and lithium alginate.

There is not any special limitation on the molecular weight of the polymeric lithium salt. It is possible to be selected within a wide range. Preferably, the polymeric lithium salt may have a weight average molecular weight of 2000-5000000, preferably 80000-240000.

The polymeric lithium salts may be commercially available or prepared by known methods. For example, the lithium polyacrylate may be obtained by reacting polyacrylic acid with a lithium source (preferably lithium hydroxide) in the presence of a solvent (e.g., water). The lithium polymethacrylate may be obtained by reacting polymethacrylic acid with a lithium source (preferably lithium hydroxide) in the presence of a solvent (e.g., water). The polymaleate lithium can be obtained by reacting polymaleic acid with a lithium source (preferably lithium hydroxide) in the presence of a solvent (e.g., water). The lithium polyfumarate can be obtained by reacting polyfumaric acid with a lithium source (preferably lithium hydroxide) in the presence of a solvent (e.g., water). The carboxymethylcellulose lithium can be obtained by reacting carboxymethylcellulose and/or its salts (e.g., sodium salt) with a lithium source (preferably lithium hydroxide and/or lithium oxide) in the presence of a solvent (e.g., water). The lithium alginate can be obtained by reacting alginic acid and/or its salts (e.g. sodium salt) with a lithium source (preferably lithium hydroxide and/or lithium oxide) in the presence of a solvent (e.g. water). The specific reaction may be carried out according to the routine practice in the art, and not be repeated here.

The polymeric lithium salt may be contained in the phosphorus-containing coating layer or in the carbon layer. Preferably, the polymeric lithium salt is contained in the carbon layer, and more preferably, at least a part of lithium ions of the polymeric lithium salt are intercalated in the porous carbon layer.

There is not any special limitation on the content of polymeric lithium salt in the negative electrode materials. It is possible to be selected within a wide range. Preferably, based on the total amount of the negative electrode material, the polymeric lithium salt is present in an amount of 0-34 wt %, more preferably 10-30 wt %.

Optionally, the negative electrode material may further comprise graphite. Although the theoretical capacity of carbon is much lower than that of silicon, the introduction of graphite into the negative electrode material can compensate the low conductivity of silicon and thereby greatly improve the cycle charging capacity retention. In addition, the use of graphite does not suffer from the problem of volume expansion experienced by silicon negative electrode materials during charging and discharging.

Optionally, the negative electrode material may further comprise a conductive agent. The conductive agent is preferably at least one selected from the group consisting of carbon nanotubes, acetylene black and conductive carbon black. The carbon nanotube, acetylene black and conductive carbon black have the meanings commonly understood by those skilled persons in the art and may be commercially available.

Preferably, based on the total amount of the negative electrode material, the conductive agent is present in an amount of 1-10 wt %, more preferably 1-6 wt %.

The negative electrode material of the present disclosure may be in a form of particles. When graphite is not introduced into the negative electrode material, the negative electrode material has a small median particle size ($D_{50}$), generally of 0.1-20 microns, and the particle size distribution is narrower. Preferably, the negative electrode material is in a form of nanoparticles. The nanosizing of negative electrode material may further improve the comprehensive electrical properties. When graphite is introduced into the negative electrode material, the negative electrode material may have an increased particle size. For example, when graphite is included, the median particle size of the negative electrode material may be 1-25 microns.

In one embodiment, the present disclosure relates to a method for preparing a negative electrode material, wherein the negative electrode material comprises a silicon-containing material and a phosphorus-containing coating layer at the surface of the silicon-containing material, wherein the phosphorus-containing coating layer comprises a polymer having polycyclic aromatic hydrocarbon structural segments, and wherein the method comprises the steps of:
(1) contacting the silicon-containing material, a phosphorus source and a solvent at 30-80° C. to graft the phosphorus source to the surface of the silicon-containing material; and
(2) subjecting to a temperature programmed calcining to convert the phosphorus source around the silicon-containing material into the phosphorus-containing coating layer comprising the polymer having polycyclic aromatic hydrocarbon structural segments, wherein the temperature programmed calcining comprises:
heating to a first temperature of 400-500° C. at a first heating rate,
heating to a second temperature of 600-800° C. at a second heating rate, wherein the second heating rate is lower than the first heating rate, and
keeping at the second temperature.

The phosphorus source may be any phosphorus-containing precursor that can be converted into the polymer having polycyclic aromatic hydrocarbon structural segments, for example by polycondensation. The preferred phosphorus source is selected from the group consisting of organic polybasic phosphoric acid and its esters or salts, preferably phytic acid.

In the step (1), the mass ratio of phosphorus source to the silicon-containing material is 0.1-2:1, preferably 0.5-1:1. It is possible to select any value in the range, such as 0.1:1, 0.5:1, 1:1, 1.5:1, 2:1.

The solvent used in the step (1) may be an organic solvent commonly used in the art, preferably at least one selected from the group consisting of toluene, N,N-dimethylformamide, N,N-dimethylacetamide and N-methylpyrrolidone. The solvent may be present in such amount that the material obtained in the step (1) has a solid content of 5-40 wt %, preferably 5-30 wt %.

The step (1) may be carried out by: first mixing the phosphorus source with the solvent, then adding the silicon-containing material, heating to a temperature of 30-80° C. and keeping for 0.5-4 hours; or first mixing the silicon-containing material with the solvent, then adding the phosphorus source, heating to a temperature of 30-80° C. and keeping for 0.5-4 hours. Preferably, the phosphorus source and solvent are mixed first, then the silicon-containing material is added, and the mixture is heated to 30-80° C. and kept for 1-4 hours.

By the step (1), the phosphorus source is evenly grafted to the surface of the silicon-containing material to form an intermediate of the phosphorus-containing coating layer. The inventors unexpectedly found that by performing step (1) at a higher temperature (e.g. 30-80° C.) rather than at room temperature, the intermediate of the phosphorus-containing coating layer had a reduced thickness which is in high uniformity. Generally, the intermediate of the phosphorus-containing coating layer may have a thickness of 3-15 nm, preferably 4-10 nm.

The temperature programmed calcining of the step (2) may comprise: heating to a first temperature of 450-500° C., such as 480° C., at a first heating rate of 1-10° C./min, preferably 5-10° C./min; then heating to a second temperature of 600-650° C., such as 620° C., at a second heating rate of 1-5° C./min, preferably 1-3° C./min; and keeping at the second temperature for 1-8 h, preferably 2-4 h.

The temperature programmed calcining at a high temperature is advantageous to converting the phosphorus sources into the coating layer comprising polymers having polycyclic aromatic hydrocarbon structural segments. At the same time, such high temperature operation also promotes the doping of phosphorus into silicon and removes at least a part of the polar groups on the surface of the coating layer (for example, by removing phosphate groups). Without being bound by any theory, it is believed that phosphorus doped silicon may improve the conductivity of silicon-based negative electrode materials. The polymers having polycyclic aromatic hydrocarbon structural segments may impart a dense structure to the phosphorus-containing coating layer. Therefore, it can resist the volume expansion of silicon-based negative electrode materials during charging and discharging, and ensure the structural integrity and safety of the battery. At the same time, the coating layer with a dense structure can more effectively block the channel for lithium ion accessing to the silicon-based negative electrode material, thereby reduce and avoid the formation of irreversible SEI, and correspondingly alleviate and eliminate its adverse effects on electrical performances. In addition, the high-temperature operation also removes at least a part of the polar groups on the surface of the coating layer, so that the obtained negative electrode material has excellent storage stability, dispersability and processability.

In one embodiment, the present disclosure relates to the negative electrode material prepared by the above method.

In one embodiment, the present disclosure relates to use of the above negative electrode material in a lithium ion battery. Compared with the traditional pure graphite negative electrode material, the above negative electrode material contains silicon having higher theoretical capacity, which significantly improves the reversible charging specific capacity. Therefore, when the above negative electrode material is used in a lithium ion battery, the energy density of the lithium ion battery can be improved.

In one embodiment, the present disclosure relates to a lithium ion battery comprising a negative electrode comprising the above negative electrode material, a positive electrode, a separator and an electrolyte.

The lithium ion batteries according to embodiments of the present disclosure have structures well known to those skilled persons in the art. In general, the separator is disposed between the positive electrode and the negative electrode. Moreover, the positive electrode contains a positive electrode material. There is not any special limitation on the chemical composition of the positive electrode material. It may be a lithium-based positive electrode material commonly used in the art.

The separator may be various separators commonly used in lithium-ion batteries, such as polypropylene microporous films, polyethylene mat, glass fiber mat or ultra-fine glass fiber paper.

The electrolyte may be various conventional electrolytes, such as non-aqueous electrolyte. The non-aqueous electrolyte is a solution formed by an electrolyte lithium salt in a non-aqueous solvent. The lithium salt suitable for forming a non-aqueous electrolyte may be at least one selected from the group consisting of lithium hexafluorophosphate ($LiPF_6$), lithium perchlorate ($LiClO_4$), lithium tetrafluoroborate ($LiBF_4$), lithium hexafluoroarsenate ($LiAsF_6$) and lithium hexafluorosilicate ($LiSiF_6$). Suitable non-aqueous solvents may be selected from the group consisting of linear esters and cyclic esters and mixtures thereof. The linear esters may be at least one selected from the group consisting of dimethyl carbonate (DMC), diethyl carbonate (DEC), methyl ethyl carbonate (EMC), methyl propyl carbonate (MPC) and dipropyl carbonate (DPC). The cyclic esters may be at least one selected from the group consisting of ethylene carbonate (EC), propylene carbonate (PC) and butylene carbonate (BC).

EXAMPLES

The features and advantages of the present invention are apparent from the following examples. The examples are intended to illustrate and not to limit the invention in any way.

Testing Methods

1. For Identifying Materials 1.1 Transmission Electron Microscope (TEM) Images

The morphology of a sample is characterized with transmission electron microscope. Specifically, the transmission electron microscope used is JEM-2100 transmission electron microscope from Japan Electronics Co., Ltd., and the test conditions include acceleration voltage of 160 KV. The sample is placed on the copper support net and then inserted into the electron microscope for observation. A magnification of 800000 is used for observation.

1.2 Element Distribution from Line Scanning

The elements in the coating layer are characterized with spherical aberration transmission electron microscope. Specifically, the transmission electron microscope used is Titan Cubed Themis G2 300 transmission electron microscope from FEI Company, America. The test conditions include acceleration voltage of 300 KV, HAADF detector for collecting signals, and receiving angle of 52-200 mrad. The sample is placed on the ultra-thin carbon film for observation, and the analysis on the chemical composition of the sample is completed by the X-ray energy spectrometer (Aztec X-max 100TLE) equipped in the electron microscope.

1.3 Carbon Nuclear Magnetic Resonance ($^{13}$C-NMR) Spectrum

The microstructure of a material is characterized with JNMR-500 solid state nuclear magnetic resonance spectrometer from Japan Electronics Co., Ltd. The test conditions include: 8 mm zirconia rotor, rotating speed of 5000-6000. The resonance frequency of $^{13}$C is 125.72 MHz, and tetramethylsilane is used as the reference for chemical shift. The test scheme of high-power decoupling and cross polarization is adopted, and the scanning times are 5000 times.

1.4 Silicon Nuclear Magnetic Resonance ($^{29}$Si-NMR) Spectrum

The microstructure of a material is characterized with JNMR-500 solid state nuclear magnetic resonance spectrometer from Japan Electronics Co., Ltd. The test conditions include: 8 mm zirconia rotor, rotating speed of 5000-6000. The resonance frequency of $^{29}$Si is 79.49 MHz, and tetramethylsilane is used as the reference for chemical shift. The test scheme of high-power decoupling and cross polarization is adopted, and the scanning times are 5000 times.

2. For Electrical Properties of Materials

The prepared negative electrode materials are assembled into lithium ion battery samples. The electrochemical properties of the obtained lithium ion battery samples are tested with Wuhan blue battery test system (CT2001B). The test conditions include voltage range of 0.05V-2V. Each negative electrode material is assembled into 10 samples in a form of coin cell. The battery performances of the samples are detected under the same voltage and current. The average value thereof is used as the measured value.

2.1 The Profile of the First Charging and Discharging

Under the voltage range of 0.05V-2V and the current rate of 0.1 C, the assembled lithium ion battery samples are subjected to the first charging and discharging, and the profile of the first charging and discharging is obtained. The battery test system (CT2001B) gives the first discharge capacity and first charge capacity of the tested battery. The first discharge capacity is the specific capacity of the negative electrode material, and the first charge capacity is the reversible charging specific capacity of the negative electrode material. The initial coulombic efficiency (also referred to as "ICE") can be calculated from them:

ICE=the reversible charging specific capacity of the negative electrode material/the specific capacity of the negative electrode material.

2.2 Cycle Stability Test

At a current rate of 0.2 C, the assembled lithium ion battery sample is subjected to charging and discharging for selected cycles, such as 20, 50 or 100 cycles. The reversible charging specific capacity of the sample at each cycle is measured. The cycle charging capacity retention of each cycle is calculated according to the following:

cycle charging capacity retention=reversible charging specific capacity at the selected cycle/reversible charging specific capacity at the first charging× 100%

The profile of cycle stability is plotted by taking the cycle numbers as the X-axis and the cycle charging capacity retention as the Y-axis.

2.3 Cycle Stability Test at Different Current Rates

The samples are subjected to 5 charging and discharging cycles at current rates of 1/3 C, 1/2 C, 1 C, 2 C, 3 C and 5 C respectively. The reversible charging specific capacity of the samples at each cycle is measured. The cycle charging capacity retention of each cycle is calculated as described above.

The profile of cycle stability at different current rates is plotted by taking the cycle numbers as the X-axis and the cycle charging capacity retention as the Y-axis.

Generally, at the same current rate, the cycle charging capacity retention of a negative electrode material is positively correlated with its conductivity. In other words, the negative electrode material having better conductivity may have higher cycle charging capacity retention at the same rate. Therefore, it is possible to use the cycle stability at different current rates to indicate the conductivity of the negative electrode material.

3. Reagents

Lithium polyacrylate is prepared. Specifically, 10 g of polyacrylic acid with a weight average molecular weight of 240000 is added to 40 g deionized water to prepare a polyacrylic acid solution with a concentration of 20 mass %. To the polyacrylic acid solution, 3.4 g lithium hydroxide is added. The mixture is heated at 40° C. under stirring until all solids are dissolved, and then dried at 100° C. for 4 h to obtain lithium polyacrylate.

Other reagents are commercially available.

Example 1

8.425 g N,N-dimethylformamide and 0.225 g phytic acid were mixed to form a solution. 0.45 g silicon powder ($D_{50}$=120 nm) was added to the solution. The mixture was heated to 40° C. under stirring and kept for 50 minutes. The obtained material was sampled for transmission electron microscope test to obtain TEM image of the same. The result was shown in (b) in FIG. 1. The data measured by transmission electron microscope showed the formation of an intermediate of phosphorus-containing coating layer with a thickness of 4 nm around silicon. In addition, silicon was a crystalline material and thereby had lattice stripes. In contrast, the intermediate of the phosphorus-containing coating layer was organic and thereby had amorphous structure. They showed different textures in TEM images. Therefore, by distinguishing the lattice stripes and amorphous structure texture in TEM image, the boundary of the intermediate of the phosphorus-containing coating layer was drawn, shown as the curves in (b) of FIG. 1. The thickness of the intermediate of the phosphorus-containing coating layer was basically uniform, which was consistent with the data given by transmission electron microscope.

The obtained material was heated to 480° C. at the first heating rate of 5° C./min, then heated to 620° C. at the second heating rate of 2° C./min, and kept at 620° C. for 3 hours.

After cooling to room temperature, obtained was the product, named as the negative electrode material P1.

Figure 2:
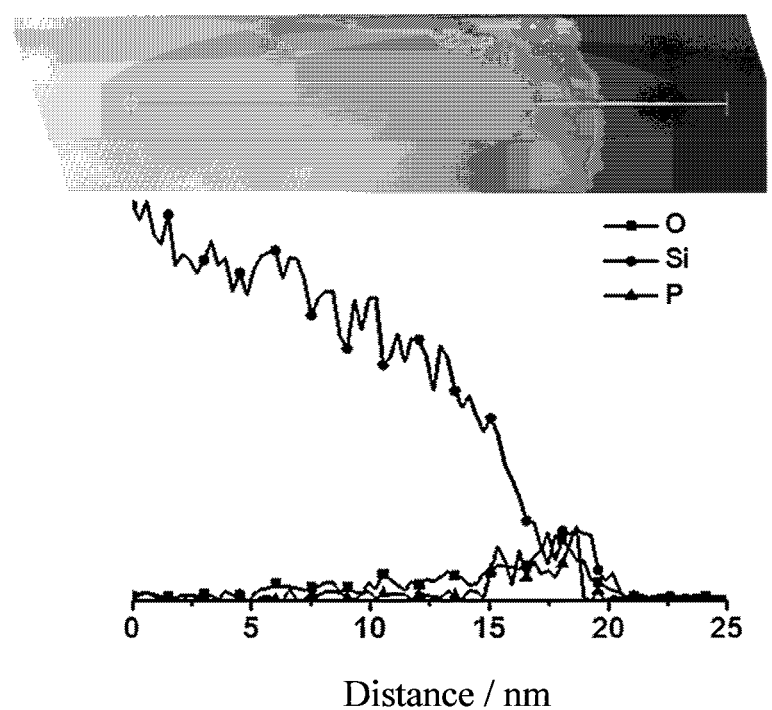
FIG. 2 shows the element distribution from line scanning of the negative electrode material P1 obtained in example 1.

The negative electrode material P1 was sampled for the line scanning test as described above to obtain the element distribution of the same. The result was shown in FIG. 2. As shown in FIG. 2, as scanning outward from the core, the content of silicon gradually decreased, and the content of phosphorus showed peaks in the range of 15-18.7 nm. It indicated the formation of a phosphorus-containing coating layer with a thickness of 3.7 nm on the surface of silicon.

In addition, the sample was subjected to carbon nuclear magnetic resonance test as described above, to obtain $^{13}$C-NMR spectrum of the same. The result was shown as the upper graph in FIG. 3. As shown in the upper graph of FIG. 3, there were signals in the region of 110-140 ppm and peaks at 138 ppm and 119 ppm, indicating the presence of polycyclic aromatic hydrocarbon structural segments in the phosphorus-containing coating layer at the surface of silicon.

Figure 4:
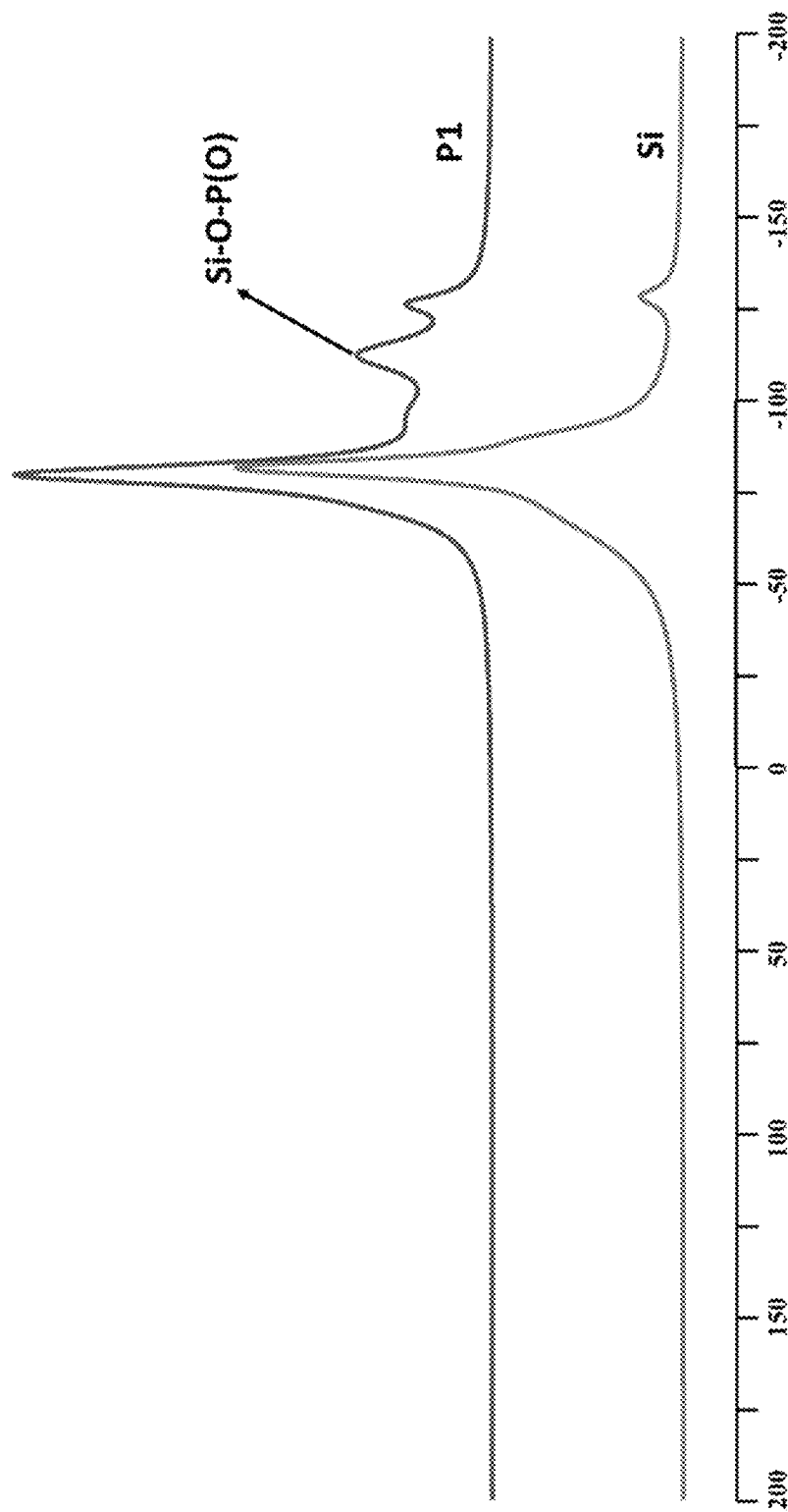
FIG. 4 shows the $^{29}$Si-NMR spectrum of the negative electrode material P1 obtained in example 1.

In addition, the sample was subjected to silicon NMR test as described above, to obtain $^{29}$Si-NMR spectrum of the same. The result was shown in FIG. 4. As shown in FIG. 4, there was P(O)—O—Si bond in the negative electrode material P1, indicating the connecting of phosphorus and silicon via P(O)—O—Si bond.

A lithium ion battery sample for testing the electrical properties of the negative electrode material was prepared as follows. 1 g of the obtained negative electrode material P1 was used to form a slurry. The slurry was evenly coated on a copper foil collector and dried at 120° C. for 10 h to obtain a negative electrode N1 containing the negative electrode material P1. A CR2016 coin cell was assembled with the negative electrode N1, a metal lithium sheet as positive electrode, 1 mol/L LiPF$_6$ solution as electrolyte (wherein a mixture of vinyl carbonate and diethyl carbonate in a ratio of 3:7 by volume was used as solvents) and a polypropylene microporous film as separator.

The coin cell was subjected to the battery performance test as described above, to characterize the electrical performances of the negative electrode material P1 obtained in example 1.

Figure 5:
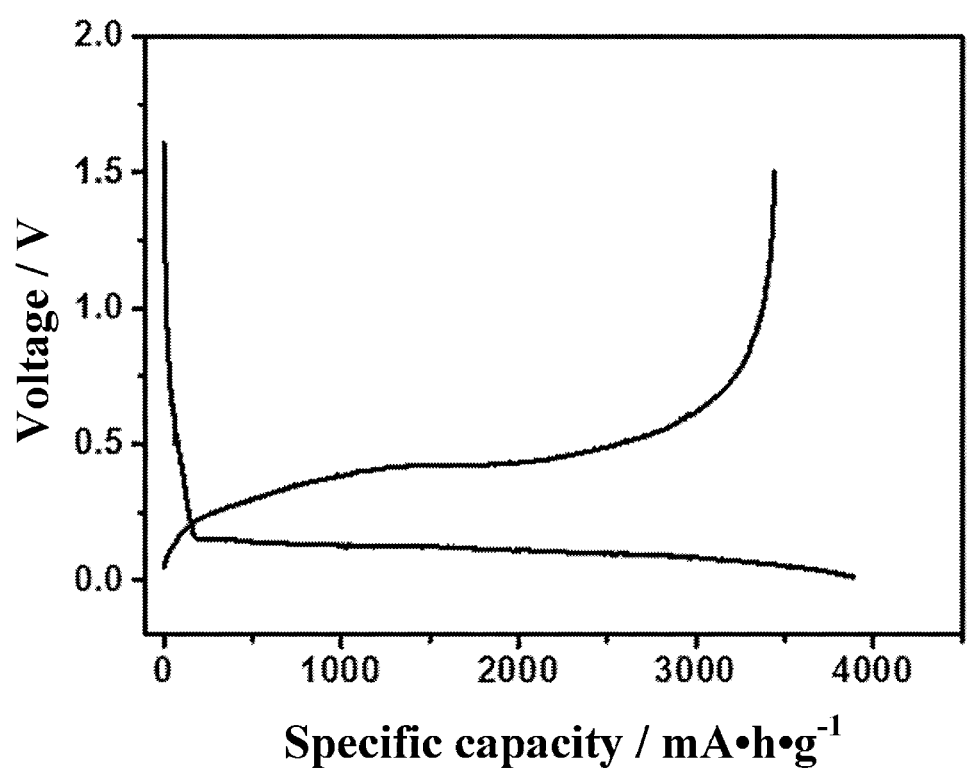
FIG. 5 shows the profile of the first charging and discharging of a lithium ion battery using the negative electrode material P1 of example 1.

FIG. 5 was the profile of the first charging and discharging of the coin cell which was based on the negative electrode material P1 of example 1. As could be seen from FIG. 5, the negative electrode material P1 of example 1 had a first discharge capacity (specific capacity) of 3858 mAh/g, and a first charge capacity (reversible charging specific capacity) of 3442 mAh/g, which suggested an initial coulombic efficiency (ICE) of 89.2%.

Figure 6:
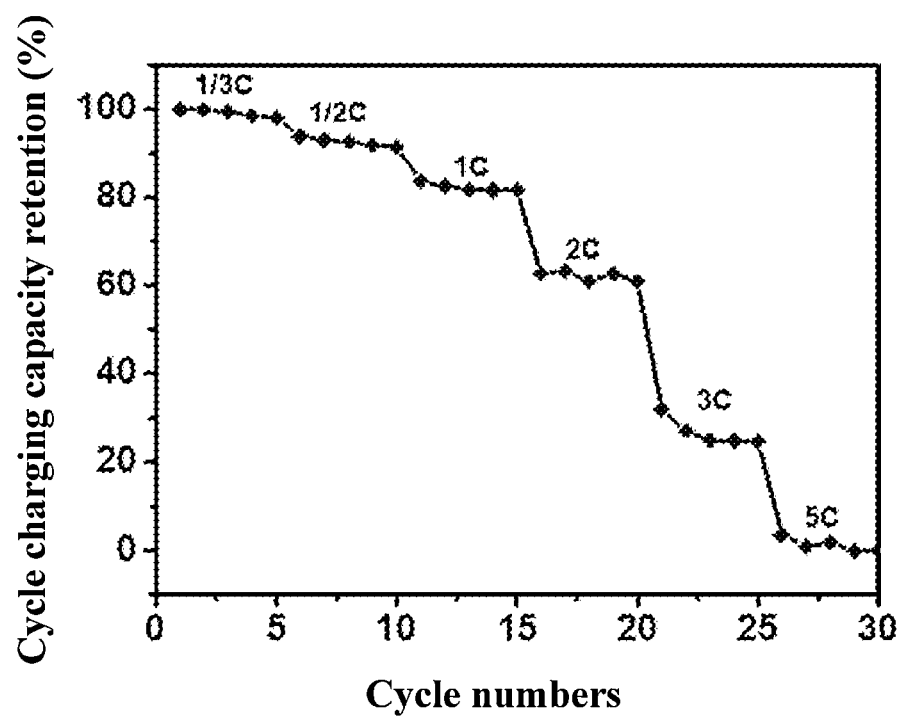
FIG. 6 shows the profile of the cycle stability at different current rates of a lithium ion battery using the negative electrode material P1 of example 1.

FIG. 6 was the profile of the cycle stability at different current rates of the coin cell which was based on the negative electrode material P1 of example 1. As could be seen from FIG. 6, the negative electrode material P1 of example 1 had cycle charging capacity retentions at a current rate of 1/3 C, 1/2 C, 1 C, 2 C, 3 C and 5 C of 100%, 92%, 81%, 63%, 37% and 6% respectively.

Figure 7:
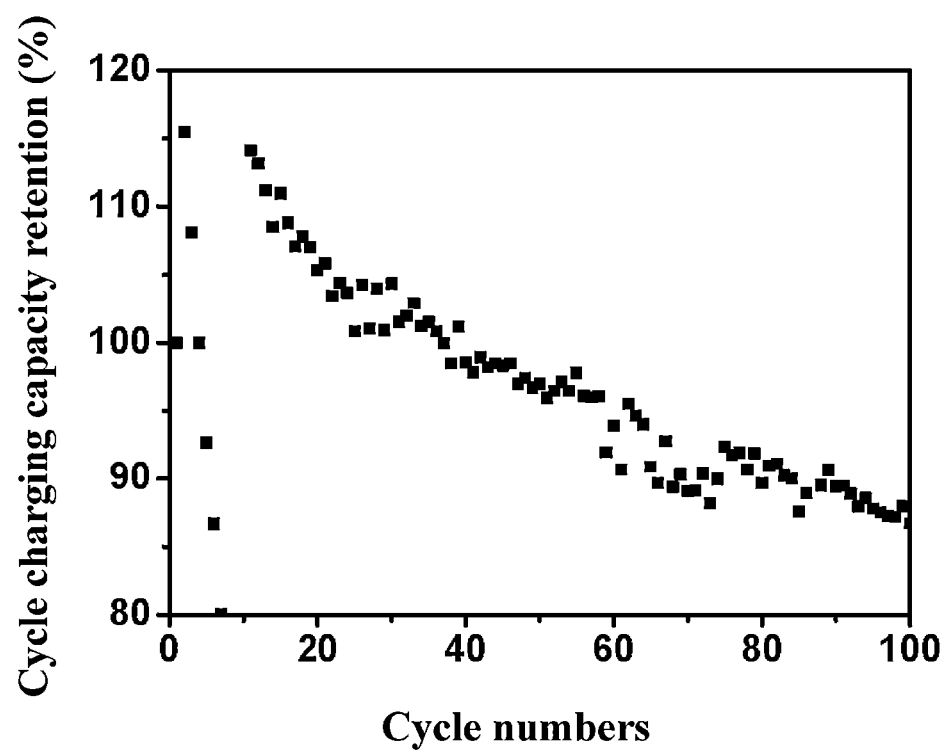
FIG. 7 shows the profile of the cycle stability of a lithium ion battery using the negative electrode material P1 of example 1.

FIG. 7 was the profile of the cycle stability of the coin cell which was based on the negative electrode material P1 of example 1. As shown in the figure, the negative electrode material P1 of example 1 had cycle charging capacity retention of 86.7% after 100 charging and discharging cycles at a current rate of 0.2 C.

Example 2

8.425 g N,N-dimethylformamide and 0.225 g phytic acid were mixed to form a solution. 0.45 g silicon powder ($D_{50}$=120 nm) was added to the solution. The mixture was heated to 60° C. under stirring and kept for 90 minutes. The obtained material was sampled for transmission electron microscope test to obtain TEM image of the same. The result was shown in (c) in FIG. 1. The data measured by transmission electron microscope showed the formation of an intermediate of phosphorus-containing coating layer with a thickness of 10 nm around silicon. In addition, by distinguishing the lattice stripes and amorphous structure texture in TEM image as described above, the boundary of the intermediate of the phosphorus-containing coating layer was drawn, shown as the curves in (c) of FIG. 1. The thickness of the intermediate of the phosphorus-containing coating layer was basically uniform, which was consistent with the data given by transmission electron microscope.

The obtained material was heated to 500° C. at the first heating rate of 8° C./min, then heated to 650° C. at the second heating rate of 3° C./min, and kept at 650° C. for 2 hours.

After cooling to room temperature, obtained was the product, named as the negative electrode material P2.

The negative electrode material P2 was sampled for the line scanning as described above to obtain the element distribution of the same, which was similar to FIG. 2. The sample had a $^{13}$C-NMR spectrum similar to the upper graph in FIG. 3. The sample had a $^{29}$Si-NMR spectrum similar to FIG. 4. Therefore, the negative electrode material P2 had a morphology similar to that of the negative electrode material P1.

The preparation of a lithium ion battery sample for testing the electrical properties of the negative electrode material outlined in example 1 was repeated except that the negative electrode material P1 was replaced with the negative electrode material P2. The test results showed that the negative electrode material P2 of example 2 had a reversible charging capacity of 3208 mAh/g and an ICE of 87.8%. The negative electrode material P2 of example 2 had a cycle charging capacity retention of 87.4% after 100 charging and discharging cycles at a current rate of 0.2 C.

Example 3

8.425 g N,N-dimethylformamide and 0.225 g phytic acid were mixed to form a solution. 0.45 g silicon powder ($D_{50}$=120 nm) was added to the solution. The mixture was heated to 70° C. under stirring and kept for 90 minutes. The obtained material was sampled for transmission electron microscope test to obtain TEM image of the same. The result was shown in (d) in FIG. 1. The data measured by transmission electron microscope showed the formation of an intermediate of phosphorus-containing coating layer with a thickness of 12 nm around silicon. In addition, by distinguishing the lattice stripes and amorphous structure texture in TEM image as described above, the boundary of the intermediate of the phosphorus-containing coating layer was drawn, shown as the curves in (d) of FIG. 1. The thickness of the intermediate of the phosphorus-containing coating layer was basically uniform, which was consistent with the data given by transmission electron microscope.

The obtained material was heated to 450° C. at the first heating rate of 10° C./min, then heated to 600° C. at the second heating rate of 3° C./min, and kept at 600° C. for 4 hours.

After cooling to room temperature, obtained was the product, named as the negative electrode material P3.

The negative electrode material P3 was sampled for the line scanning as described above to obtain the element distribution of the same, which was similar to FIG. 2. The sample had a $^{13}$C-NMR spectrum similar to the upper graph in FIG. 3. The sample had a $^{29}$Si-NMR spectrum similar to FIG. 4. Therefore, the negative electrode material P3 had a morphology similar to that of the negative electrode material P1.

The preparation of a lithium ion battery sample for testing the electrical properties of the negative electrode material outlined in example 1 was repeated except that the negative electrode material P1 was replaced with the negative electrode material P3. The test results showed that the negative electrode material P3 of example 3 had a reversible charging capacity of 3119 mAh/g and an ICE of 87.5%. The negative electrode material P3 of example 3 had a cycle charging capacity retention of 87.9% after 100 charging and discharging cycles at a current rate of 0.2 C.

Comparative Example 1

8.425 g N,N-dimethylformamide and 0.225 g phytic acid were mixed to form a solution. 0.45 g silicon powder ($D_{50}$=120 nm) was added to the solution. The mixture was kept under stirring at room temperature for 50 minutes. The obtained material was sampled for transmission electron microscope test to obtain TEM image of the same. The result was shown in (a) in FIG. 1. The data measured by transmission electron microscope showed the formation of an intermediate of phosphorus-containing coating layer with a greater and uneven thickness around silicon, wherein the thickness is 20 nm in some parts and 90 nm in others. In addition, as mentioned above, by distinguishing the lattice stripes and amorphous structure texture in TEM image, the boundary of the intermediate of the phosphorus-containing coating layer was drawn, shown as the curves in (a) of FIG. 1. The thickness of the intermediate of the phosphorus-containing coating layer was uneven, which was consistent with the data given by transmission electron microscope.

The obtained material was heated to 480° C. at the first heating rate of 5° C./min, then heated to 620° C. at the second heating rate of 2° C./min, and kept at 620° C. for 3 hours.

After cooling to room temperature, obtained was the product, named as the negative electrode material CP1.

Figure 3:
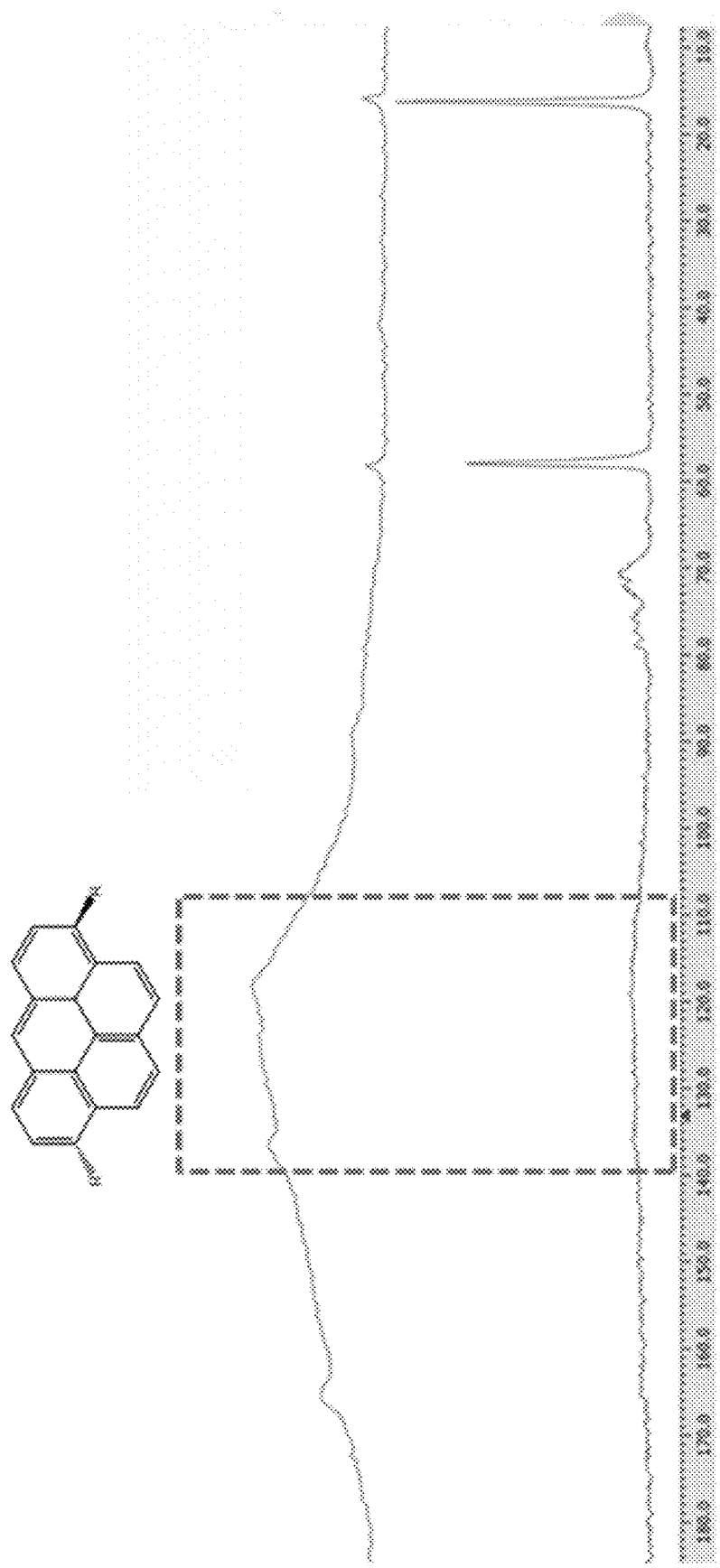
FIG. 3 shows the $^{13}$C-NMR spectra of the negative electrode material P1 obtained in example 1 and the negative electrode material CP2 obtained in comparative example 2.

The negative electrode material CP1 was sampled and tested as described above to obtain $^{13}$C-NMR spectrum of the same, which was similar to the upper graph in FIG. 3. It indicated the presence of polymers having polycyclic aromatic hydrocarbon structural segments in the phosphorus-containing coating layer of the negative electrode material CP1.

The preparation of a lithium ion battery sample for testing the electrical properties of the negative electrode material outlined in example 1 was repeated except that the negative electrode material P1 was replaced with the negative electrode material CP1. The test results showed that the negative electrode material CP1 of comparative example 1 had a reversible charging capacity of 2820 mAh/g and an ICE of 84.3%. The negative electrode material CP1 of comparative example 1 had a cycle charging capacity retention of 65.9% after 100 charging and discharging cycles at a current rate of 0.2 C.

Comparative Example 2

8.425 g N,N-dimethylformamide and 0.225 g phytic acid were mixed to form a solution. 0.45 g silicon powder ($D_{50}$=120 nm) was added to the solution. The mixture was heated to 40° C. under stirring and kept for 6 hours.

After cooling to room temperature, obtained was the product, named as the negative electrode material CP2.

The negative electrode material CP2 was sampled and tested as described above to obtain $^{13}$C-NMR spectrum of the same. The result was shown as the lower graph in FIG. 3. As shown in the lower graph of FIG. 3, there was not any signal in the region of 110-140 ppm whereas there were two broad peaks at 70-80 ppm, which were interpreted as $^{13}$C-NMR signal peaks for phytic acid. It indicated that phytic acid did not undergo polycondensation and there was no polycyclic aromatic hydrocarbon structural segment. $^{13}$C-NMR spectrum of phytic acid could be found in: JR Zhou, J W Erdman Jr. Phytic acid in health and disease [J]. Critical Reviews in Food Science and Nutrition, 1995, 35(6):495-508, which is fully incorporated herein by reference. The preparation of a lithium ion battery sample for testing the electrical properties of the negative electrode material outlined in example 1 was repeated except that the negative electrode material P1 was replaced with the negative electrode material CP2. The test results showed that the negative electrode material CP2 of comparative example 2 had a reversible charging capacity of 2621 mAh/g and an ICE of 80.6%.

Figure 8:
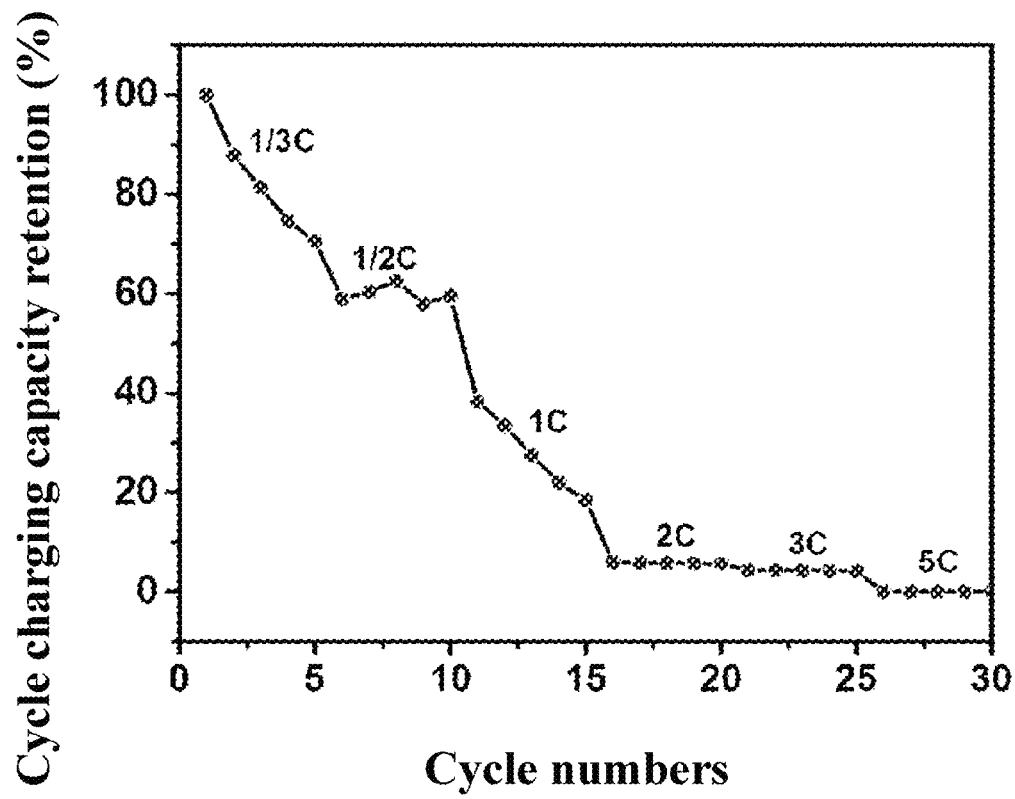
FIG. 8 shows the profile of the cycle stability at different current rates of a lithium ion battery using the negative electrode material CP2 of comparative example 2.

FIG. 8 was the profile of the cycle stability at different current rates of the coin cell which was based on the negative electrode material CP2 of comparative example 2. The negative electrode material CP2 of comparative example 2 had cycle charging capacity retentions at current rate of 1/3 C, 1/2 C, 1 C, 2 C, 3 C and 5 C of 70%, 60%, 20%, 5%, 3% and 1% respectively.

When comparing FIG. 6 with FIG. 8, it could be seen that when subjecting to charging and discharging cycle at the same current rate, the negative electrode material P1 of example 1 achieved better charge capacity retention than the negative electrode material of comparative example 2. It indicated that the negative electrode material P1 of example 1 had better conductivity than the negative electrode material of comparative example 2.

Figure 9:
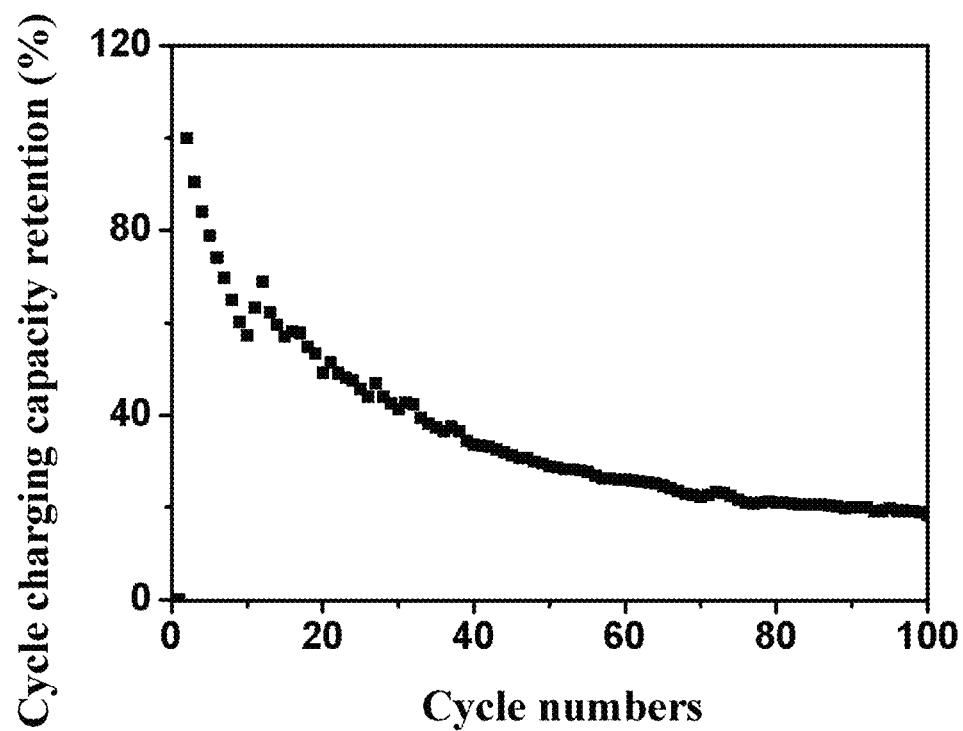
FIG. 9 shows the profile of the cycle stability of a lithium ion battery using the negative electrode material CP2 of comparative example 2.

FIG. 9 was the profile of the cycle stability of the coin cell which was based on the negative electrode material CP2 of comparative example 2. As shown in FIG. 9, the negative electrode material CP2 of comparative example 2 had a cycle charging capacity retention of less than 18.9% after 100 charging and discharging cycles at a current rate of 0.2 C.

Example 4

The negative electrode material P1 of example 1 was blended with graphite in a mass ratio of 10:1 to obtain the negative electrode material P4. The negative electrode material P4 was sampled and tested by transmission electron microscope as described above. The test results showed that graphite was distributed on the outer surface.

The preparation of a lithium ion battery sample for testing the electrical properties of the negative electrode material outlined in example 1 was repeated except that the negative electrode material P1 was replaced with the negative electrode material P4. The test results showed that the negative electrode material P4 of example 4 had a reversible charging capacity of 552 mAh/g and an ICE of 88.5%. The negative electrode material P4 of example 4 had a cycle charging capacity retention of 89.2% after 100 charging and discharging cycles at a current rate of 0.2 C.

Example 5

The negative electrode material P1 of example 1 was blended with lithium polyacrylate in a mass ratio of 10:1 to obtain the negative electrode material P5.

The preparation of a lithium ion battery sample for testing the electrical properties of the negative electrode material outlined in example 1 was repeated except that the negative electrode material P1 was replaced with the negative electrode material P5. The test results showed that the negative electrode material P5 of example 5 had a reversible charging capacity of 3289 mAh/g and an ICE of 90.5%. The negative electrode material P5 of example 5 had a cycle charging capacity retention of 85.5% after 100 charging and discharging cycles at a current rate of 0.2 C.

Example 6

1 g of the negative electrode material P1 of example 1 together with 0.12 g of petroleum pitch was added to 10 g of N,N-dimethylformamide, and the mixture was ultrasonically stirred for 40 minutes. The slurry obtained after stirring was transferred to a 50 mL centrifuge tube and centrifuged at 5000 rpm for 5 minutes. The lower solids were collected and dried at 100° C. for 4 h. Obtained was a pitch coated negative electrode material P1. It was treated in a tubular furnace by heating to 800° C. at a rate of 5° C./min, keeping under nitrogen atmosphere for 30 minutes, and then cooling naturally to room temperature. Obtained was a negative electrode material P1 with a carbon housing. 0.125 g of lithium polyacrylate and the negative electrode material P1 with the carbon housing were added into 3 mL deionized water and stirred at room temperature for 12 h. Then, the obtained slurry was placed in a freeze vacuum drying oven with a cold trap temperature of −80° C. and a cavity vacuum of 100 Pa to be dried for 12 hours. Lithium ion was intercalated into the carbon housing of the negative electrode material P1 with the carbon housing to obtain a negative electrode material P6.

The preparation of a lithium ion battery sample for testing the electrical properties of the negative electrode material outlined in example 1 was repeated except that the negative electrode material P1 was replaced with the negative electrode material P6. The test results showed that the negative electrode material P6 of example 6 had a reversible charging capacity of 3552 mAh/g and an ICE of 91.3%. The negative electrode material P6 of example 6 had a cycle charging capacity retention of 90.4% after 100 charging and discharging cycles at a current rate of 0.2 C.

Example 7

1) 0.45 g silicon powder ($D_{50}$=120 nm) was added to 8.65 g solution of N,N-dimethylformamide/phytic acid (which was consisting of 8.425 g N,N-dimethylformamide and 0.225 g phytic acid). The mixture was stirred for 40 minutes.

2) The slurry obtained after stirring was transferred to a 50 mL centrifuge tube and centrifuged at 5000 rpm for 5 minutes. The lower solids were collected and dried at 100° C. for 4 h, to obtain phosphorus-containing silicon powder.

According to TEM image of the phosphorus containing silicon powder, the surface of the nano silicon powder was coated with a layer of phosphorus-containing material to form a "core-shell" structure.

According to X-ray photoelectron spectrum of the phosphorus-containing silicon powder, phosphorus element and silicon element were combined through P(O)—O—Si. The above chemical bond ensured that the coating layer was stable and would not be affected by the external environment. Thereby, the material might show its excellent electrical properties.

3) 10 g polyacrylic acid with a weight average molecular weight of 240000 was added to 40 g deionized water to prepare a polyacrylic acid solution with a concentration of 20 mass %. 3.4 g lithium hydroxide was added to the polyacrylic acid solution. The mixture was heated and stirred at 40° C. until all solids were dissolved, to obtain a slurry containing lithium polyacrylate.

4) To the slurry with lithium polyacrylate in an amount of 0.55 g, 4 g the phosphorus-containing silicon powder and 0.25 g conductive carbon black were successively added. The mixture was stirred for 2 h, to obtain a slurry of lithium-containing negative electrode material S-1. The content of each component of the lithium-containing negative electrode material S-1 was listed in Table 1.

According to the total reflection Fourier transform absorption infrared spectrum of polyacrylic acid and lithium polyacrylate obtained in the step 3), before the reaction with lithium hydroxide, polyacrylic acid had a vibration peak of C=O at 1700 cm$^{-1}$. After the lithiation, the peak blue shifted to 1580 cm$^{-1}$, indicating that C(O)—OH was changed into C(O)—OLi after the reaction.

5) 1 g of the slurry of lithium-containing negative electrode material S-1 obtained in step 4) was evenly coated on a copper foil collector, and dried at 120° C. for 10 h to obtain an electrode sheet of lithium-containing negative electrode material S-1.

A CR2016 coin cell was assembled by using the electrode sheet obtained in the step 5) and a metal lithium sheet as positive electrode and negative electrode respectively, 1 mol/L LiPF$_6$ solution as electrolyte (wherein a mixture of vinyl carbonate and diethyl carbonate in a ratio of 3:7 by volume was used as the solvent) and a polypropylene microporous film as separator. The battery was used to characterize the electrical properties of the lithium-containing negative electrode material S-1 of the example.

The profile of the first charging and discharging of the coin cell which was based on the lithium-containing negative electrode material S-1 was obtained (at the conditions of a test voltage of 0.05-3 V and a current of 50 mA). The test results showed that the lithium-containing negative electrode material S-1 had a reversible charging capacity of 3000 mAh/g and an ICE of 86.9%.

Example 8

1) 0.45 g silicon powder ($D_{50}$=120 nm) was added to 8.65 g solution of N,N-dimethylformamide/phytic acid (which was consisting of 8.425 g N,N-dimethylformamide and 0.45 g phytic acid). The mixture was stirred for 40 minutes.

2) The slurry obtained after stirring was transferred to a 50 mL centrifuge tube and centrifuged at 5000 rpm for 5 minutes. The lower solids were collected and dried at 100° C. for 4 h, to obtain phosphorus-containing silicon powder.

The TEM image and X-ray photoelectron spectrum of the phosphorus-containing silicon powder were similar to those of the phosphorus-containing silicon powder of example 7, respectively.

3) 10 g polyacrylic acid with a weight average molecular weight of 2000000 was added to 90 g deionized water to prepare a polyacrylic acid solution with a concentration of 10 mass %. 3.4 g lithium hydroxide was added to the polyacrylic acid solution. The mixture was heated and stirred at 40° C. until all solids were dissolved, to obtain a slurry containing lithium polyacrylate.

4) To the slurry with lithium polyacrylate in an amount of 0.52 g, 4 g the phosphorus-containing silicon powder and 0.25 g conductive carbon black were successively added. The mixture was stirred for 2 h, to obtain a slurry of lithium-containing negative electrode material S-2. The content of each component of the lithium-containing negative electrode material S-2 was listed in Table 1.

5) 1 g of the slurry of lithium-containing negative electrode material S-2 obtained in step 4) was evenly coated on a copper foil collector, and dried at 120° C. for 10 h to obtain an electrode sheet of lithium-containing negative electrode material S-2.

The assembling of battery and the testing of electrical performance in example 7 were repeated except that electrode sheet of lithium-containing negative electrode material S-1 was replaced by the electrode sheet of lithium-containing negative electrode material S-2. The test results showed that the lithium-containing negative electrode material S-2 had a reversible charging capacity of 2720 mAh/g and an ICE of 85.2%.

Example 9

1) 0.45 g silicon powder ($D_{50}$=120 nm) was added to 8.65 g solution of N,N-dimethylformamide/phytic acid (which was consisting of 8.425 g N,N-dimethylformamide and 0.09 g phytic acid). The mixture was stirred for 40 minutes.

2) The slurry obtained after stirring was transferred to a 50 mL centrifuge tube and centrifuged at 5000 rpm for 5 minutes. The lower solids were collected and dried at 100° C. for 4 h, to obtain phosphorus-containing silicon powder.

The TEM image and X-ray photoelectron spectrum of the phosphorus-containing silicon powder were similar to those of the phosphorus-containing silicon powder of example 7, respectively.

3) 10 g polyacrylic acid with a weight average molecular weight of 100000 was added to 40 g deionized water to prepare a polyacrylic acid solution with a concentration of 20 mass %. 3.4 g lithium hydroxide was added to the polyacrylic acid solution. The mixture was heated and stirred at 40° C. until all solids were dissolved, to obtain a slurry containing lithium polyacrylate.

4) To the slurry with lithium polyacrylate in an amount of 0.46 g, 4 g the phosphorus-containing silicon powder and 0.25 g conductive carbon black were successively added. The mixture was stirred for 2 h, to obtain a slurry of lithium-containing negative electrode material S-3. The content of each component of the lithium-containing negative electrode material S-3 was listed in Table 1.

5) 1.5 g of the slurry of lithium-containing negative electrode material S-3 obtained in step 4) was evenly coated on a copper foil collector, and dried at 120° C. for 10 h to obtain an electrode sheet of lithium-containing negative electrode material S-3.

The assembling of battery and the testing of electrical performance in example 7 were repeated except that electrode sheet of lithium-containing negative electrode material S-1 was replaced by the electrode sheet of lithium-containing negative electrode material S-3. The test results showed that the lithium-containing negative electrode material S-3 had a reversible charging capacity of 2978 mAh/g and an ICE of 86.1%.

Example 10

1) 0.45 g silicon powder ($D_{50}$=120 nm) was added to 8.65 g solution of N,N-dimethylformamide/phytic acid (which was consisting of 8.425 g N,N-dimethylformamide and 0.225 g phytic acid). The mixture was stirred for 40 minutes.

2) The slurry obtained after stirring was transferred to a 50 mL centrifuge tube and centrifuged at 5000 rpm for 5 minutes. The lower solids were collected and dried at 100° C. for 4 h, to obtain phosphorus-containing silicon powder.

The TEM image and X-ray photoelectron spectrum of the phosphorus-containing silicon powder were similar to those of the phosphorus-containing silicon powder of example 7, respectively.

3) 10 g polyacrylic acid with a weight average molecular weight of 200000 was added to 40 g deionized water to prepare a polyacrylic acid solution with a concentration of 20 mass %. 1.2 g lithium hydroxide was added to the polyacrylic acid solution. The mixture was heated and stirred at 40° C. until all solids were dissolved, to obtain a slurry containing lithium polyacrylate.

4) To the slurry with lithium polyacrylate in an amount of 0.42 g, 4 g the phosphorus-containing silicon powder and 0.25 g conductive carbon black were successively added. The mixture was stirred for 2 h, to obtain a slurry of lithium-containing negative electrode material S-4. The content of each component of the lithium-containing negative electrode material S-4 was listed in Table 1.

5) 1.5 g of the slurry of lithium-containing negative electrode material S-4 obtained in step 4) was evenly coated on a copper foil collector, and dried at 120° C. for 10 h to obtain an electrode sheet of lithium-containing negative electrode material S-4.

The assembling of battery and the testing of electrical performance in example 7 were repeated except that electrode sheet of lithium-containing negative electrode material S-1 was replaced by the electrode sheet of lithium-containing negative electrode material S-4. The test results showed that the lithium-containing negative electrode material S-4 had a reversible charging capacity of 2650 mAh/g and an ICE of 83.1%.

Example 11

1) 0.45 g silicon monoxide powder ($D_{50}$=120 nm) was added to 8.65 g solution of N,N-dimethylformamide/phytic acid (which was consisting of 8.425 g N,N-dimethylformamide and 0.9 g phytic acid). The mixture was stirred for 40 minutes.

2) The slurry obtained after stirring was transferred to a 50 mL centrifuge tube and centrifuged at 5000 rpm for 5 minutes. The lower solids were collected and dried at 100° C. for 4 h, to obtain phosphorus-containing silicon monoxide powder.

The TEM image and X-ray photoelectron spectrum of the phosphorus-containing silicon monoxide powder were similar to those of the phosphorus-containing silicon powder of example 7, respectively.

3) 10 g polyacrylic acid with a weight average molecular weight of 200000 was added to 40 g deionized water to prepare a polyacrylic acid solution with a concentration of 20 mass %. 0.35 g lithium hydroxide was added to the polyacrylic acid solution. The mixture was heated and stirred at 40° C. until all solids were dissolved, to obtain a slurry containing lithium polyacrylate.

4) To the slurry with lithium polyacrylate in an amount of 0.34 g, 4 g the phosphorus-containing silicon monoxide powder and 0.25 g conductive carbon black were successively added. The mixture was stirred for 2 h, to obtain a slurry of lithium-containing negative electrode material S-5. The content of each component of the lithium-containing negative electrode material S-5 was listed in Table 1.

5) 1.2 g of the slurry of lithium-containing negative electrode material S-5 obtained in step 4) was evenly coated on a copper foil collector, and dried at 120° C. for 10 h to obtain an electrode sheet of lithium-containing negative electrode material S-5.

The assembling of battery and the testing of electrical performance in example 7 were repeated except that electrode sheet of lithium-containing negative electrode material S-1 was replaced by the electrode sheet of lithium-containing negative electrode material S-5. The test results showed that the lithium-containing negative electrode material S-5 had a reversible charging capacity of 1650 mAh/g and an ICE of 73.5%.

Example 12

1) 0.45 g silicon powder ($D_{50}$=120 nm) was added to 8.65 g solution of N,N-dimethylformamide/phytic acid (which was consisting of 8.425 g N,N-dimethylformamide and 0.225 g phytic acid). The mixture was stirred for 40 minutes.

2) The slurry obtained after stirring was transferred to a 50 mL centrifuge tube and centrifuged at 5000 rpm for 5 minutes. The lower solids were collected and dried at 100° C. for 4 h, to obtain phosphorus-containing silicon powder.

The TEM image and X-ray photoelectron spectrum of the phosphorus-containing silicon powder were similar to those of the phosphorus-containing silicon powder of example 7, respectively.

3) 10 g polyacrylic acid with a weight average molecular weight of 200000 was added to 40 g deionized water to prepare a polyacrylic acid solution with a concentration of 20 mass %. 2 g lithium oxide was added to the polyacrylic acid solution. The mixture was heated and stirred at 40° C. until all solids were dissolved, to obtain a slurry containing lithium polyacrylate.

4) To the slurry with lithium polyacrylate in an amount of 0.27 g, 4 g the phosphorus-containing silicon powder and 0.25 g conductive carbon black were successively added. The mixture was stirred for 2 h, to obtain a slurry of lithium-containing negative electrode material S-6. The content of each component of the lithium-containing negative electrode material S-6 was listed in Table 1.

5) 1.2 g of the slurry of lithium-containing negative electrode material S-6 obtained in step 4) was evenly coated on a copper foil collector, and dried at 120° C. for 10 h to obtain an electrode sheet of lithium-containing negative electrode material S-6.

The assembling of battery and the testing of electrical performance in example 7 were repeated except that electrode sheet of lithium-containing negative electrode material S-1 was replaced by the electrode sheet of lithium-containing negative electrode material S-6. The test results showed that the lithium-containing negative electrode material S-6 had a reversible charging capacity of 3120 mAh/g and an ICE of 87.2%.

Example 13

1) 0.45 g silicon monoxide powder ($D_{50}$=120 nm) was added to 8.65 g solution of N,N-dimethylformamide/phytic acid (which was consisting of 8.425 g N,N-dimethylformamide and 0.225 g phytic acid). The mixture was stirred for 40 minutes.

2) The slurry obtained after stirring was transferred to a 50 mL centrifuge tube and centrifuged at 5000 rpm for 5 minutes. The lower solids were collected and dried at 100° C. for 4 h, to obtain phosphorus-containing silicon monoxide powder.

The TEM image and X-ray photoelectron spectrum of the phosphorus-containing silicon monoxide powder were similar to those of the phosphorus-containing silicon powder of example 7, respectively.

3) 10 g polyacrylic acid with a weight average molecular weight of 200000 was added to 40 g deionized water to prepare a polyacrylic acid solution with a concentration of 20 mass %. 0.3 g lithium oxide was added to the polyacrylic acid solution. The mixture was heated and stirred at 40° C. until all solids were dissolved, to obtain a slurry containing lithium polyacrylate.

4) To the slurry with lithium polyacrylate in an amount of 0.21 g, 4 g the phosphorus-containing silicon monoxide powder and 0.05 g conductive carbon black were successively added. The mixture was stirred for 2 h, to obtain a slurry of lithium-containing negative electrode material S-7. The content of each component of the lithium-containing negative electrode material S-7 was listed in Table 1.

5) 1.2 g of the slurry of lithium-containing negative electrode material S-7 obtained in step 4) was evenly coated on a copper foil collector, and dried at 120° C. for 10 h to obtain an electrode sheet of lithium-containing negative electrode material S-7.

The assembling of battery and the testing of electrical performance in example 7 were repeated except that electrode sheet of lithium-containing negative electrode material S-1 was replaced by the electrode sheet of lithium-containing negative electrode material S-7. The test results showed that the lithium-containing negative electrode material S-7 had a reversible charging capacity of 1810 mAh/g and an ICE of 80.1%.

Example 14

1) 0.45 g silicon powder ($D_{50}$=120 nm) was added to 8.65 g solution of N,N-dimethylformamide/phytic acid (which was consisting of 8.425 g N,N-dimethylformamide and 0.225 g phytic acid). The mixture was stirred for 40 minutes.

2) The slurry obtained after stirring was transferred to a 50 mL centrifuge tube and centrifuged at 5000 rpm for 5 minutes. The lower solids were collected and dried at 100° C. for 4 h, to obtain phosphorus-containing silicon powder.

The TEM image and X-ray photoelectron spectrum of the phosphorus-containing silicon powder were similar to those of the phosphorus-containing silicon powder of example 7, respectively.

3) 10 g polyacrylic acid with a weight average molecular weight of 200000 was added to 40 g deionized water to prepare a polyacrylic acid solution with a concentration of 20 mass %. 4.5 g lithium carbonate was added to the polyacrylic acid solution. The mixture was heated and stirred at 40° C. until all solids were dissolved, to obtain a slurry containing lithium polyacrylate.

4) To the slurry with lithium polyacrylate in an amount of 0.18 g, 4 g the phosphorus-containing silicon powder and 0.25 g conductive carbon black were successively added. The mixture was stirred for 2 h, to obtain a slurry of lithium-containing negative electrode material S-8. The content of each component of the lithium-containing negative electrode material S-8 was listed in Table 1.

5) 1 g of the slurry of lithium-containing negative electrode material S-8 obtained in step 4) was evenly coated on a copper foil collector, and dried at 120° C. for 10 h to obtain an electrode sheet of lithium-containing negative electrode material S-8.

The assembling of battery and the testing of electrical performance in example 7 were repeated except that electrode sheet of lithium-containing negative electrode material S-1 was replaced by the electrode sheet of lithium-containing negative electrode material S-8. The test results showed that the lithium-containing negative electrode material S-8 had a reversible charging capacity of 2950 mAh/g and an ICE of 86.1%.

Example 15

1) 0.45 g silicon powder ($D_{50}$=120 nm) was added to 8.65 g solution of N,N-dimethylformamide/phytic acid (which was consisting of 8.425 g N,N-dimethylformamide and 0.225 g phytic acid). The mixture was stirred for 40 minutes.

2) The slurry obtained after stirring was transferred to a 50 mL centrifuge tube and centrifuged at 5000 rpm for 5 minutes. The lower solids were collected and dried at 100° C. for 4 h, to obtain phosphorus-containing silicon powder.

The TEM image and X-ray photoelectron spectrum of the phosphorus-containing silicon powder were similar to those of the phosphorus-containing silicon powder of example 7, respectively.

3) 10 g alginic acid with a weight average molecular weight of 120000 was added to 40 g deionized water to prepare an alginic acid solution with a concentration of 20 mass %. 3.2 g lithium hydroxide was added to the alginic acid solution. The mixture was heated and stirred at 40° C. until all solids were dissolved, to obtain a slurry containing lithium alginate.

4) To the slurry with lithium alginate in an amount of 0.15 g, 4 g the phosphorus-containing silicon powder and 0.25 g conductive carbon black were successively added. The mixture was stirred for 2 h, to obtain a slurry of lithium-containing negative electrode material S-9. The content of each component of the lithium-containing negative electrode material S-9 was listed in Table 1.

5) 1 g of the slurry of lithium-containing negative electrode material S-9 obtained in step 4) was evenly coated on a copper foil collector, and dried at 120° C. for 10 h to obtain an electrode sheet of lithium-containing negative electrode material S-9.

The assembling of battery and the testing of electrical performance in example 7 were repeated except that electrode sheet of lithium-containing negative electrode material S-1 was replaced by the electrode sheet of lithium-containing negative electrode material S-9. The test results showed that the lithium-containing negative electrode material S-9 had a reversible charging capacity of 2760 mAh/g and an ICE of 83.5%.

Example 16

1) 0.45 g silicon powder ($D_{50}$=120 nm) was added to 8.65 g solution of N,N-dimethylformamide/phytic acid (which was consisting of 8.425 g N,N-dimethylformamide and 0.225 g phytic acid). The mixture was stirred for 40 minutes.

2) The slurry obtained after stirring was transferred to a 50 mL centrifuge tube and centrifuged at 5000 rpm for 5 minutes. The lower solids were collected and dried at 100° C. for 4 h, to obtain phosphorus-containing silicon powder.

The TEM image and X-ray photoelectron spectrum of the phosphorus-containing silicon powder were similar to those of the phosphorus-containing silicon powder of example 7, respectively.

3) 10 g carboxymethyl cellulose with a weight average molecular weight of 10000 was added to 40 g deionized water to prepare a carboxymethyl cellulose solution with a concentration of 20 mass %. 2.5 g lithium hydroxide was added to the carboxymethyl cellulose solution. The mixture was heated and stirred at 40° C. until all solids were dissolved, to obtain a slurry containing lithium carboxymethyl cellulose.

4) To the slurry with lithium carboxymethyl cellulose in an amount of 0.13 g, 4 g the phosphorus-containing silicon powder and 0.25 g conductive carbon black were successively added. The mixture was stirred for 2 h, to obtain a slurry of lithium-containing negative electrode material S-10. The content of each component of the lithium-containing negative electrode material S-10 was listed in Table 1.

5) 1.5 g of the slurry of lithium-containing negative electrode material S-10 obtained in step 4) was evenly coated on a copper foil collector, and dried at 120° C. for 10 h to obtain an electrode sheet of lithium-containing negative electrode material S-10.

The assembling of battery and the testing of electrical performance in example 7 were repeated except that electrode sheet of lithium-containing negative electrode material S-1 was replaced by the electrode sheet of lithium-containing negative electrode material S-10. The test results showed that the lithium-containing negative electrode material S-10 had a reversible charging capacity of 2632 mAh/g and an ICE of 81.4%.

Example 17

1) 0.45 g silicon powder ($D_{50}$=120 nm) was added to 8.65 g solution of N,N-dimethylformamide/phytic acid (which was consisting of 8.425 g N,N-dimethylformamide and 0.225 g phytic acid). The mixture was stirred for 40 minutes.

2) The slurry obtained after stirring was transferred to a 50 mL centrifuge tube and centrifuged at 5000 rpm for 5 minutes. The lower solids were collected and dried at 100° C. for 4 h, to obtain phosphorus-containing silicon powder.

The TEM image and X-ray photoelectron spectrum of the phosphorus-containing silicon powder were similar to those of the phosphorus-containing silicon powder of example 7, respectively.

3) 10 g polymethacrylic acid with a weight average molecular weight of 240000 was added to 40 g deionized water to prepare a polymethacrylic acid solution with a concentration of 20 mass %. 2.5 g lithium hydroxide was added to the polymethacrylic acid solution. The mixture was heated and stirred at 40° C. until all solids were dissolved, to obtain a slurry containing lithium polymethacrylate.

4) To the slurry with lithium polymethacrylate in an amount of 0.13 g, 4 g the phosphorus-containing silicon powder and 0.25 g conductive carbon black were successively added. The mixture was stirred for 2 h, to obtain a slurry of lithium-containing negative electrode material S-11. The content of each component of the lithium-containing negative electrode material S-11 was listed in Table 1.

5) 1.5 g of the slurry of lithium-containing negative electrode material S-11 obtained in step 4) was evenly coated on a copper foil collector, and dried at 120° C. for 10 h to obtain an electrode sheet of lithium-containing negative electrode material S-11.

The assembling of battery and the testing of electrical performance in example 7 were repeated except that electrode sheet of lithium-containing negative electrode material S-1 was replaced by the electrode sheet of lithium-containing negative electrode material S-11. The test results showed that the lithium-containing negative electrode material S-11 had a reversible charging capacity of 2753 mAh/g and an ICE of 83.6%.

Example 18

1) 0.45 g silicon powder ($D_{50}$=120 nm) was added to 8.65 g solution of N,N-dimethylformamide/phytic acid (which was consisting of 8.425 g N,N-dimethylformamide and 0.225 g phytic acid). The mixture was stirred for 40 minutes.

2) The slurry obtained after stirring was transferred to a 50 mL centrifuge tube and centrifuged at 5000 rpm for 5 minutes. The lower solids were collected and dried at 100° C. for 4 h, to obtain phosphorus-containing silicon powder.

The TEM image and X-ray photoelectron spectrum of the phosphorus-containing silicon powder were similar to those of the phosphorus-containing silicon powder of example 7, respectively.

3) 10 g polymaleic acid with a weight average molecular weight of 80000 was added to 40 g deionized water to prepare a polymaleic acid solution with a concentration of 20 mass %. 2.5 g lithium hydroxide was added to the polymaleic acid solution. The mixture was heated and stirred at 40° C. until all solids were dissolved, to obtain a slurry containing lithium polymaleate.

4) To the slurry with lithium polymaleate in an amount of 0.13 g, 4 g the phosphorus-containing silicon powder and 0.25 g conductive carbon black were successively added. The mixture was stirred for 2 h, to obtain a slurry of lithium-containing negative electrode material S-12. The content of each component of the lithium-containing negative electrode material S-12 was listed in Table 1.

5) 1.5 g of the slurry of lithium-containing negative electrode material S-12 obtained in step 4) was evenly coated on a copper foil collector, and dried at 120° C. for 10 h to obtain an electrode sheet of lithium-containing negative electrode material S-12.

The assembling of battery and the testing of electrical performance in example 7 were repeated except that electrode sheet of lithium-containing negative electrode material S-1 was replaced by the electrode sheet of lithium-containing negative electrode material S-12. The test results showed that the lithium-containing negative electrode material S-12 had a reversible charging capacity of 2695 mAh/g and an ICE of 82.1%.

Example 19

1) 0.45 g silicon powder ($D_{50}$=120 nm) was added to 8.65 g solution of N,N-dimethylformamide/phytic acid (which was consisting of 8.425 g N,N-dimethylformamide and 0.225 g phytic acid). The mixture was stirred for 40 minutes.

2) The slurry obtained after stirring was transferred to a 50 mL centrifuge tube and centrifuged at 5000 rpm for 5 minutes. The lower solids were collected and dried at 100° C. for 4 h, to obtain phosphorus-containing silicon powder.

The TEM image and X-ray photoelectron spectrum of the phosphorus-containing silicon powder were similar to those of the phosphorus-containing silicon powder of example 7, respectively.

3) 10 g polyfumaric acid with a weight average molecular weight of 120000 was added to 40 g deionized water to prepare a polyfumaric acid solution with a concentration of 20 mass %. 2.5 g lithium hydroxide was added to the polyfumaric acid solution. The mixture was heated and stirred at 40° C. until all solids were dissolved, to obtain a slurry containing lithium polyfumarate.

4) To the slurry with lithium polyfumarate in an amount of 0.13 g, 4 g the phosphorus-containing silicon powder and 0.25 g conductive carbon black were successively added. The mixture was stirred for 2 h, to obtain a slurry of lithium-containing negative electrode material S-13. The content of each component of the lithium-containing negative electrode material S-13 was listed in Table 1.

5) 1.5 g of the slurry of lithium-containing negative electrode material S-13 obtained in step 4) was evenly coated on a copper foil collector, and dried at 120° C. for 10 h to obtain an electrode sheet of lithium-containing negative electrode material S-13.

The assembling of battery and the testing of electrical performance in example 7 were repeated except that electrode sheet of lithium-containing negative electrode material S-1 was replaced by the electrode sheet of lithium-containing negative electrode material S-13. The test results showed that the lithium-containing negative electrode material S-13 had a reversible charging capacity of 2710 mAh/g and an ICE of 82.5%.

Comparative Example a

Example 7 was repeated except that there was not addition of 3.4 g lithium hydroxide in the step 3), to prepare the negative electrode material D-1. The content of each component of the negative electrode material D-1 was listed in Table 1.

The assembling of battery and the testing of electrical performance in example 7 were repeated except that electrode sheet of lithium-containing negative electrode material S-1 was replaced by the negative electrode material D-1.

The profile of the first charging and discharging of the coin cell which was based on the negative electrode material D-1 was obtained. The negative electrode material D-1 had a reversible charging capacity of 908 mAh/g and an ICE of 38.9%.

Comparative Example b

Example 7 was repeated except that no phosphorus source was involved in the preparation of the negative electrode material.

In particular, 10 g polyacrylic acid with a weight average molecular weight of 240000 was added to 40 g deionized water to prepare a polyacrylic acid solution with a concentration of 20 mass %. 3.4 g lithium hydroxide was added to the polyacrylic acid solution. The mixture was heated and stirred at 40° C. until all solids were dissolved, to obtain a slurry containing lithium polyacrylate.

To the slurry with lithium polyacrylate in an amount of 0.55 g, 4 g silicon powder ($D_{50}$=120 nm) and 0.25 g conductive carbon black were successively added. The mixture was stirred for 2 h, to obtain a slurry of negative electrode material D-2. The content of each component of the negative electrode material D-2 was listed in Table 1.

1 g of the slurry of the negative electrode material D-2 was evenly coated on a copper foil collector, and dried at 120° C. for 10 h to obtain an electrode sheet of the negative electrode material D-2.

The assembling of battery and the testing of electrical performance in example 7 were repeated except that electrode sheet of lithium-containing negative electrode material S-1 was replaced by the electrode sheet of the negative electrode material D-2. The test results showed that the negative electrode material D-2 had a reversible charging capacity of 1650 mAh/g and an ICE of 83.5%.

TABLE 1

|  | polymeric lithium salt, wt % | phosphorus source, wt % | active component, wt % | conductive agent, wt % |
| --- | --- | --- | --- | --- |
| Example 7 | 11.5 | 27.8 | 55.5 | 5.2 |
| Example 8 | 10.9 | 41.9 | 41.9 | 5.2 |
| Example 9 | 9.8 | 14.2 | 70.7 | 5.3 |
| Example 10 | 9.0 | 28.5 | 57.1 | 5.4 |
| Example 11 | 7.4 | 58.1 | 29.0 | 5.5 |
| Example 12 | 6.0 | 29.5 | 59.0 | 5.5 |
| Example 13 | 4.9 | 31.3 | 62.6 | 1.2 |
| Example 14 | 4.1 | 30.1 | 60.2 | 5.7 |
| Example 15 | 3.4 | 30.3 | 60.6 | 5.7 |
| Example 16 | 3.0 | 30.4 | 60.9 | 5.7 |
| Example 17 | 3.0 | 30.4 | 60.9 | 5.7 |
| Example 18 | 3.0 | 30.4 | 60.9 | 5.7 |
| Example 19 | 3.0 | 30.4 | 60.9 | 5.7 |
| Comparative example a | 0 | 31.4 | 62.7 | 5.9 |
| Comparative example b | 11.5 | 0 | 83.3 | 5.2 |

It could be seen from the above examples and results that, compared with the negative electrode materials of the comparative examples, the negative electrode materials according to the embodiments of the present disclosure had improved reversible charging capacity, initial coulombic efficiency and cycle charging capacity retention, especially cycle charging capacity retention in prolonged term.

The preferred embodiments of invention have been described in detail above. However, the present invention is not limited thereto. Various simple modifications may be made to the embodiments of invention within the technical scope of the present invention, including the combinations of various technical features in any other suitable way. Those simple modifications and combinations should also be regarded as the contents disclosed herein and being within the protection scope of the present disclosure.

The invention claimed is:

1. A negative electrode material, comprising: a silicon-containing material having a phosphorus-containing coating layer at a surface of the silicon-containing material,
   wherein the phosphorus-containing coating layer comprises a polymer having polycyclic aromatic hydrocarbon structural segments,
   wherein the negative electrode material further comprises a porous carbon layer disposed on a surface of the phosphorus-containing coating layer and a polymeric lithium salt intercalated in the porous carbon layer.

2. The negative electrode material according to claim 1, wherein the silicon-containing material is at least one selected from the group consisting of elemental silicon, SiOx wherein 0.6<x<1.5, and silicon-containing alloy.

3. The negative electrode material according to claim 2, wherein the elemental silicon is in a form of silicon powder having a median particle size of 0.05-10 μm.

4. The negative electrode material according to claim 1, wherein the 13C-NMR spectrum of the polymer having polycyclic aromatic hydrocarbon structural segments includes signals at 110 ppm-140 ppm; and/or
   wherein phosphorus in the phosphorus-containing coating layer and silicon in the silicon-containing material are connected via P(O)—O—Si bond.

5. The negative electrode material according to claim 1, wherein the negative electrode material further comprises graphite; and/or wherein the negative electrode material further comprises a conductive agent.

6. The negative electrode material according to claim 5, wherein the conductive agent is at least one selected from the group consisting of carbon nanotubes, acetylene black, and conductive carbon black.

7. The negative electrode material according to claim 5, wherein the conductive agent is present in an amount of 1-10 wt % based on the total amount of the negative electrode material.

8. The negative electrode material according to claim 1, wherein the negative electrode material has a median particle size of 0.1-20 microns.

9. The negative electrode material according to claim 1, wherein the polymeric lithium salt is at least one selected from the group consisting of lithium polyacrylate, lithium polymethacrylate, lithium polymaleate, lithium polyfumarate, lithium carboxymethylcellulose, and lithium alginate.

10. The negative electrode material according to claim 1, wherein the polymeric lithium salt have a weight average molecular weight of 2000-5000000.

11. The negative electrode material according to claim 1, wherein based on the total amount of the negative electrode material, the polymeric lithium salt is present in an amount of 10-30 wt %.

12. A lithium ion battery comprising a negative electrode comprising the negative electrode material according to claim 1, a positive electrode, a separator and an electrolyte.

* * * * *